US010621656B2

(12) United States Patent
Takeda et al.

(10) Patent No.: US 10,621,656 B2
(45) Date of Patent: Apr. 14, 2020

(54) INFORMATION PROCESSING APPARATUS AND INFORMATION PROCESSING METHOD FOR DIVISION OF CONTRIBUTION

(71) Applicant: SONY CORPORATION, Tokyo (JP)

(72) Inventors: Haruto Takeda, Tokyo (JP); Yoshihiro Wakita, Tokyo (JP); Shinya Ohtani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 476 days.

(21) Appl. No.: 14/466,508

(22) Filed: Aug. 22, 2014

(65) Prior Publication Data

US 2015/0066720 A1 Mar. 5, 2015

(30) Foreign Application Priority Data

Sep. 2, 2013 (JP) ................................ 2013-181533

(51) Int. Cl.
*G06Q 40/00* (2012.01)

(52) U.S. Cl.
CPC .................................... *G06Q 40/00* (2013.01)

(58) Field of Classification Search
CPC .... G06Q 30/06; G06Q 30/0643; G06Q 10/00; G06Q 40/02
See application file for complete search history.

(56) References Cited

U.S. PATENT DOCUMENTS 5,884,280 A * 3/1999 Yoshioka ........... G06Q 20/0855 705/26.1
6,691,093 B2 * 2/2004 Shell ...................... G06Q 20/10 705/14.72
7,356,507 B2 * 4/2008 Bezos .................... G06Q 20/00 705/40
2005/0043960 A1 * 2/2005 Blankley ................ G06Q 99/00 705/51

(Continued)

FOREIGN PATENT DOCUMENTS

JP 2001-344530 A * 12/2001
JP 2001-344530 A 12/2001

(Continued)

OTHER PUBLICATIONS

Glancy, Dorothy J. "Breaking Up Can Be Hard to Do: Partitioning Jointly Owned Oil and Gas and Other Mineral Interests in Texas." Tulsa LJ 33 (1997): 705.*

(Continued)

*Primary Examiner* — William E Rankins
*Assistant Examiner* — James H Miller
(74) *Attorney, Agent, or Firm* — Chip Law Group

(57) ABSTRACT

There is provided an information processing apparatus to divide an amount of contribution to a plurality of creators in association with content into a first part and a second part on the basis of a certain division ratio, the first part being distributed on the basis of a first distribution ratio, the second part being distributed on the basis of a second distribution ratio, and to calculate distribution amounts of (Continued)

the contribution to the respective creators on the basis of an amount corresponding to the first part, an amount corresponding to the second part, the first distribution ratio, and the second distribution ratio.

15 Claims, 13 Drawing Sheets

(56) References Cited

U.S. PATENT DOCUMENTS

| | | | | |
|---|---|---|---|---|
| 2009/0157630 A1* | 6/2009 | Yuan | G06Q 10/101 | |
| 2010/0010906 A1* | 1/2010 | Grecia | G06Q 20/102 | 705/21 |
| 2010/0114613 A1* | 5/2010 | Smith | G06Q 10/02 | 705/5 |

FOREIGN PATENT DOCUMENTS

| | | |
|---|---|---|
| JP | 2001344530 A * | 12/2001 |
| JP | 2003337869 A * | 11/2003 |

OTHER PUBLICATIONS

Glancy, Dorothy J. "Breaking Up Can Be Hard to Do: Partitioning Jointly Owned Oil and Gas and Other Mineral Interests in Texas." Tulsa LJ 33 (1997): 705 which teaches non-participating royalty interest as applied to oil, gas and mineral rights and fractionalization of said rights among joint owners in noncommercial situations such as divorce.*

Ex Parter Schmid 2011-007395 (Year: 2011).*

Taylor, C. (Nov. 1998). "Where the money goes: A breakdown of the $19.95 sale price of a CD." Canadian Musician, 20, 65. ( Proquest results) (Year: 1998).*

ASCAP "Controlled Composition Clauses," Oct. 27, 2009 (Year: 2009).*

Healey, J. (May 21, 2001). Net music services in royalty bind; web: Online firms say publisher's demand for reproduction and performance royalties is holding up business. Las Angeles Times. (Proquest results.) (Year: 2001).*

* cited by examiner

Figure 6B:
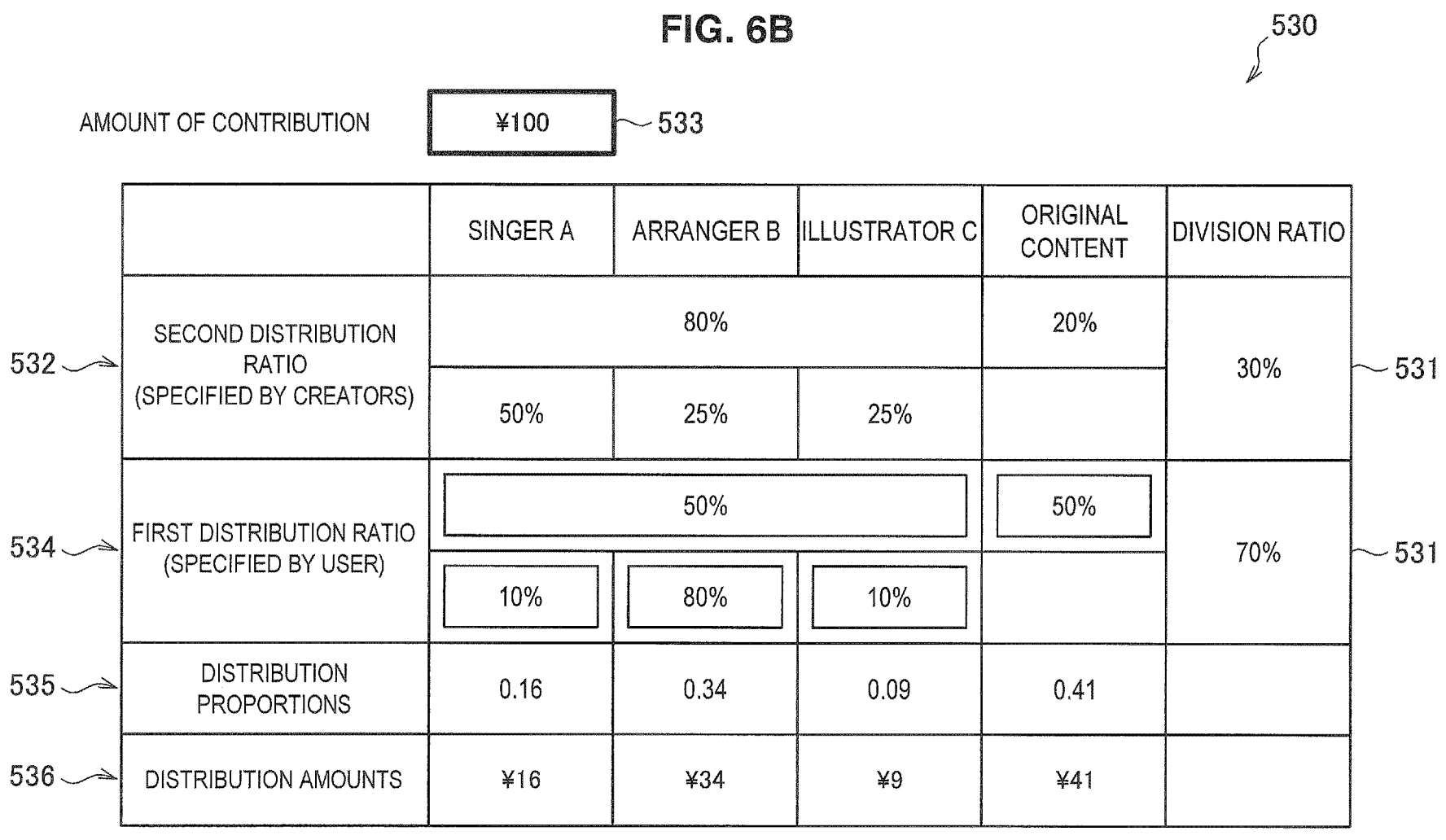

AMOUNT OF CONTRIBUTION ¥100 (533)

| | SINGER A | ARRANGER B | ILLUSTRATOR C | ORIGINAL CONTENT | DIVISION RATIO |
|---|---|---|---|---|---|
| 532 SECOND DISTRIBUTION RATIO (SPECIFIED BY CREATORS) | 80% | | | 20% | 30% (531) |
| | 50% | 25% | 25% | | |
| 534 FIRST DISTRIBUTION RATIO (SPECIFIED BY USER) | 50% | | | 50% | 70% (531) |
| | 10% | 80% | 10% | | |
| 535 DISTRIBUTION PROPORTIONS | 0.16 | 0.34 | 0.09 | 0.41 | |
| 536 DISTRIBUTION AMOUNTS | ¥16 | ¥34 | ¥9 | ¥41 | |

AMOUNT OF CONTRIBUTION : [ ] 533

| | SINGER A | ARRANGER B | ILLUSTRATOR C | ORIGINAL CONTENT | DIVISION RATIO |
|---|---|---|---|---|---|
| SECOND DISTRIBUTION RATIO (SPECIFIED BY CREATORS) 532 | 80% | | | 20% | 30% 531 |
| | 50% | 25% | 25% | | |
| FIRST DISTRIBUTION RATIO (SPECIFIED BY USER) 534a | | | | | 70% 531 |
| | | | | | |
| DISTRIBUTION PROPORTIONS 535 | | | | | |
| DISTRIBUTION AMOUNTS 536 | | | | | |
| DESIRED DISTRIBUTION AMOUNTS 537 | [ ] | [ ] | [ ] | [ ] | |

AMOUNT OF CONTRIBUTION : ¥100 (533)

| | SINGER A | ARRANGER B | ILLUSTRATOR C | ORIGINAL CONTENT | DIVISION RATIO |
|---|---|---|---|---|---|
| 532 SECOND DISTRIBUTION RATIO (SPECIFIED BY CREATORS) | 80% | | | 20% | 30% (531) |
| | 50% | 25% | 25% | | |
| 534a FIRST DISTRIBUTION RATIO (SPECIFIED BY USER) | 94% | | | 6% | 70% (531) |
| | 12% | 67% | 21% | | |
| 535 DISTRIBUTION PROPORTIONS | 0.20 | 0.50 | 0.20 | 0.10 | |
| 536 DISTRIBUTION AMOUNTS | ¥20 | ¥50 | ¥20 | ¥10 | |
| 537 DESIRED DISTRIBUTION AMOUNTS | ¥20 | ¥50 | ¥20 | ¥10 | |

INFORMATION PROCESSING APPARATUS AND INFORMATION PROCESSING METHOD FOR DIVISION OF CONTRIBUTION

CROSS REFERENCE TO RELATED APPLICATIONS

This application claims the benefit of Japanese Priority Patent Application JP 2013-181533 filed Sep. 2, 2013, the entire contents of which are incorporated herein by reference.

BACKGROUND

The present disclosure relates to an information processing apparatus, an information processing method, and a program.

In recent years, content including any of an image, a voice, and the like has been commonly provided to a large number of viewers (users) through a network. As one of methods of evaluating the provided content, a technique to make a contribution from a user to a producer (a creator) of the content is proposed. For example, JP 2001-344530A discloses a technique to realize a contribution action to a creator by a user selecting a contribution button installed on a content display screen.

SUMMARY

Meanwhile, the production of content may involve a plurality of creators. In the above technique disclosed in JP 2001-344530A, a case of making a contribution to a plurality of creators who have involved in the production of the content is not considered, and accordingly, a contribution action reflecting intentions of the user and the creators might not be realized.

Accordingly, the present disclosure proposes a novel and improved information processing apparatus, information processing method, and program which can realize a contribution action from a user to creators of content, the contribution action reflecting intentions of the user and the creators more appropriately.

According to an embodiment of the present disclosure, there is provided an information processing apparatus including a contribution amount dividing unit configured to divide an amount of contribution to a plurality of creators in association with content into a first part and a second part on the basis of a certain division ratio, the first part being distributed on the basis of a first distribution ratio, the second part being distributed on the basis of a second distribution ratio, and a distribution amount calculating unit configured to calculate distribution amounts of the contribution to the respective creators on the basis of an amount corresponding to the first part, an amount corresponding to the second part, the first distribution ratio, and the second distribution ratio.

According to another embodiment of the present disclosure, there is provided an information processing method including dividing an amount of contribution to a plurality of creators in association with content into a first part and a second part on the basis of a certain division ratio, the first part being distributed on the basis of a first distribution ratio, the second part being distributed on the basis of a second distribution ratio, and calculating, by a processor, distribution amounts of the contribution to the respective creators on the basis of an amount corresponding to the first part, an amount corresponding to the second part, the first distribution ratio, and the second distribution ratio.

According to another embodiment of the present disclosure, there is provided a program for causing a computer to realize a function of dividing an amount of contribution to a plurality of creators in association with content into a first part and a second part on the basis of a certain division ratio, the first part being distributed on the basis of a first distribution ratio, the second part being distributed on the basis of a second distribution ratio, and a function of calculating distribution amounts of the contribution to the respective creators on the basis of an amount corresponding to the first part, an amount corresponding to the second part, the first distribution ratio, and the second distribution ratio.

According to one or more of embodiments of the present disclosure, the amount of contribution to the plurality of creators in association with the content is divided into the first part and the second part on the basis of the certain division ratio, the first part being distributed on the basis of the first distribution ratio, the second part being distributed on the basis of the second distribution ratio. Further, on the basis of the amount corresponding to the first part, the amount corresponding to the second part, the first distribution ratio, and the second distribution ratio, the distribution amounts of contribution to the respective creators are calculated. In this manner, according to one or more of embodiments of the present disclosure, on the basis of the plurality of distribution ratios which are independent of each other, the distribution amounts of contribution to the respective creators are decided, and accordingly, the distribution of the amount of contribution can reflect a plurality of intentions.

According to one or more of embodiments of the present disclosure, as described above, it becomes to realize a contribution action from a user to creators of content, the contribution action reflecting intentions of the user and the creators more appropriately. Note that the above described effects are not necessarily limiting. That is, the technology according to the present disclosure can exhibit any of the effects described in the specification or other effects that are apparent to a person skilled in the art from the descriptions in the specification, along with the above effects or instead of the above effects.

BRIEF DESCRIPTION OF THE DRAWINGS

FIG. 6B shows a display example of the distribution ratio input screen according to a first embodiment of the present disclosure;

FIG. 10A shows a display example of a desired distribution amount input screen according to a second embodiment of the present disclosure;

FIG. 10B shows a display example of a desired distribution amount input screen according to a second embodiment of the present disclosure.

DETAILED DESCRIPTION OF THE EMBODIMENT(S)

Figure 1:
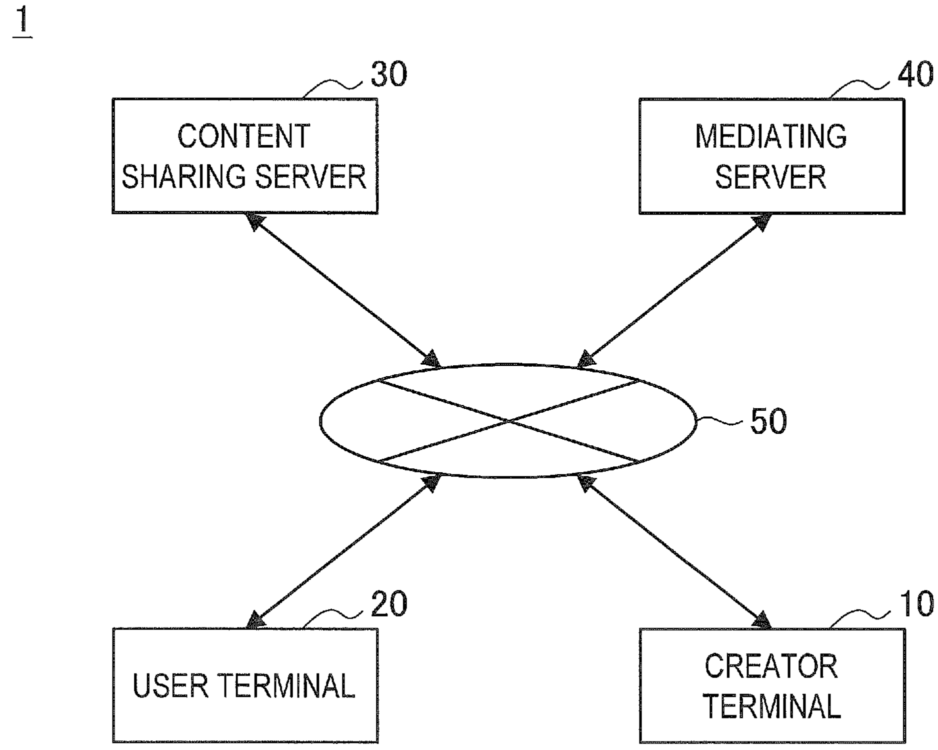
FIG. 1 is a block diagram showing a schematic configuration of a contribution amount mediating system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. First Embodiment
   - 1-1. Overview of System
   - 1-2. Processing Procedure in System
   - 1-3. Configuration of Apparatus
   - 1-4. Display Examples of Distribution Condition Input Screen
2. Second Embodiment
   - 2-1. Processing Procedure in System
   - 2-2. Configuration of Apparatus
   - 2-3. Display Examples of Distribution Condition Input Screen
3. Hardware Configuration
4. Supplementary Explanation

1. First Embodiment

[1-1. Overview of System]

In a first embodiment of the present disclosure, in a content sharing system in which content is shared between or among a plurality of viewers (users), in a case in which a user makes a contribution to a producer (creator) of the content, a contribution action is performed in a manner that a mediation between the intention on the user's side and the intention on the creator's side is accepted and the intensions on both sides are reflected. In the present embodiment, a system for realizing such a series of processes is called contribution amount mediating system. First, an overview of the contribution amount mediating system according to the first embodiment of the present disclosure will be described with reference to FIG. 1. FIG. 1 is a block diagram showing a schematic configuration of the contribution amount mediating system according to the first embodiment of the present disclosure.

Referring to FIG. 1, a contribution amount mediating system 1 according to the first embodiment of the present disclosure includes a creator terminal 10, a user terminal 20, a content sharing server 30, and a mediating server 40. The creator terminal 10, the user terminal 20, the content sharing server 30, and the mediating server 40 are connected to one another through a wired or wireless network 50 so that various pieces of information can be transmitted to and received from one another. Note that each of the creator terminal 10, the user terminal 20, the content sharing server 30, and the mediating server 40 can be achieved by a hardware configuration of an information processing apparatus that will be described later.

The creator terminal 10 can be any of a variety of terminal apparatuses such as a personal computer (PC), a tablet terminal, a smartphone, a game machine, and a media player. The creator terminal 10 is configured to be able to execute a tool for producing content, such as moving image editing software or music editing software, so that a creator can produce various content items. The creator can register the content produced by himself or herself in the content sharing system through the creator terminal 10.

The user terminal 20 can be any of a variety of terminal apparatuses such as a PC, a tablet terminal, a smartphone, a game machine, and a media player. The user terminal 20 is configured to be able to execute software such as moving image reproducing software or music reproducing software so that a user can view various content items. The user can access the content sharing system through the user terminal 20 and can view the content registered by the creator.

The content sharing server 30 generally manages the content sharing system and performs various processes in the system. For example, the content sharing server 30 manages the content registered by the creator in association with the creator. Further, for example, the content sharing server 30 can receive a user's request to view desired content from the user terminal 20, and can transmit the content to the user terminal 20. Furthermore, the content sharing server 30 may manage account information of the creator and the user (information by which an individual can be identified, such as ID or password) and may manage content by use of the account information by transmitting specific content to a specific user, for example.

The mediating server 40 mediates between the intention on the user's side and the intention on the creator's side when the user makes a contribution to the creator of the content shared by the content sharing system. Specifically, the mediating server 40 performs a process of distributing the amount of contribution to a plurality of creators in association with the content, on the basis of a distribution ratio to each creator, which can be specified by the user, and on the basis of a distribution ratio to each creator, which can be specified by the creator who registered the content.

Here, the relation between the content in the content sharing system and the creator will be described. In recent years, services of plat forms for sharing moving images and advancement in content producing tools have made it easier for not only professional creators but also amateur creators to produce various content items. For example, an amateur creator can easily produce music content with lyrics by using software for synthesizing singing voices or a dancing animation of a unique character by using software for producing moving image content using a 3-D modeling. In addition, a variety of content sharing systems are provided by which content produced by such an amateur creator can be viewed by a large number of users through the network 50.

The content produced by the amateur creator is called user generated media (UGM) below. In some cases, a plurality of creators are involved in creating UGM, such as a person who prepares for recording equipment, a person who composes music, and a person who composes lyrics. Further, linked productions (so-called secondary productions) of UGM are seen in many places; for example, music content with lyrics produced by a creator is sung by another creator, and a still another creator produces a promotion video (PV) of the content. In such a manner, reproduction of a work, such as parody, is made commonly in not only Japan but also western countries.

Some popular UGMs are commercially available by being sold as a form of a compact disc (CD) or music used in a game, for example. A user can encourage the creator of the content indirectly by purchasing the CD or the game of the commercialized content. However, commercialized content is just part of the whole, and a large part of content is not commercially available. Indeed, a user can send an encouraging message by electronic mail, for example, to the creator of such content that is not commercially available; however, it has been difficult for a user to substantially help the income of the creator. Accordingly, there has been a demand for a technique by which a user can directly help the income of the creator.

In view of the above circumstances, a technique has been proposed to send a bounty or contribution to the creator of the content from a provider of the content sharing system or a user in order to financially help the creator. For example, a technique is proposed to restore part of the fee of the content sharing system to the creator, the fee being paid by the user, in accordance with the popularity stakes of the content, which is calculated from the reproduced times or the like. Further, as in JP 2001-344530A, a technique is also proposed to realize a contribution action to the creator by the user selecting a contribution button installed on a content display screen.

However, with these existing techniques, the target of the contribution action has been the content. Accordingly, for example, in a case in which the content is produced by a plurality of creators, it has been difficult to make a contribution that reflects a user's intention, such as to make a particularly large contribution to a specific creator among the creators. Further, in a case in which the content is produced by a plurality of creators, the creators' side desires to distribute the amount of contribution between or among the creators in accordance with the degree of support for the production of the content. Furthermore, in a case in which the content is a secondary production, it is desirable to distribute the contribution to a creator or creators of source content (hereinafter also referred to as original content or parent content) of the content of the secondary production (hereinafter also referred to as child content), in a manner that the intentions on the user's side and on the creators' side are reflected. With the existing techniques, it has been difficult to meet such a demand for a contribution.

Accordingly, in the present embodiment, when a user makes a contribution to creators, the mediating server 40 mediates between the intention on the user's side and the intention on the creators' side. Specifically, the amount of contribution made by the user is divided into a first part and a second part on the basis of a certain division ratio in the mediating server 40. Then, the amount corresponding to the first part is distributed on the basis of a distribution ratio (hereinafter also referred to as first distribution ratio) to the respective creators intended by the user and the amount corresponding to the second part is distributed on the basis of a distribution ratio (hereinafter also referred to as second distribution ratio) to the respective creators intended by the creators. Thus, distribution amounts to the respective creators are decided.

Figure 2:
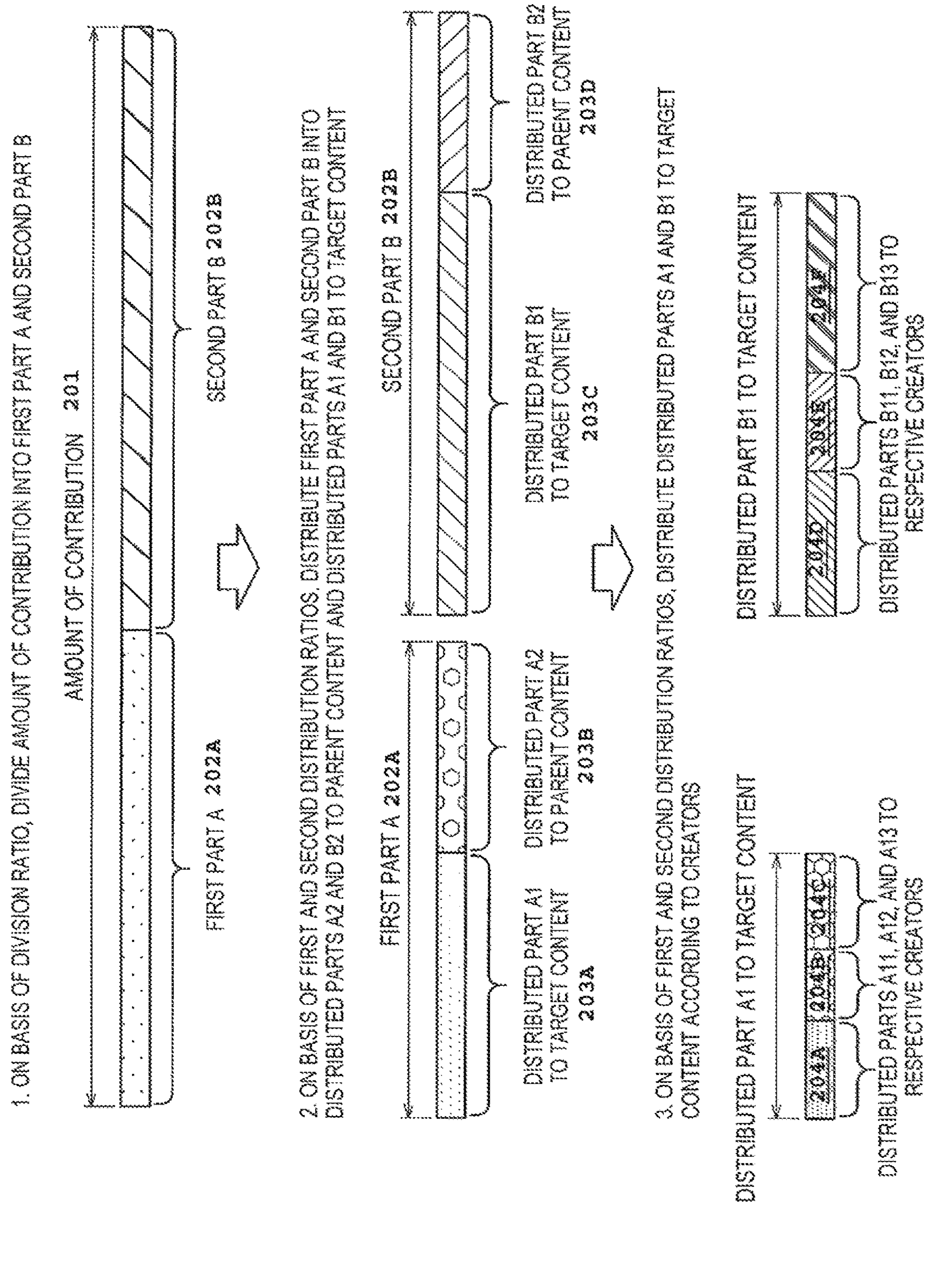
FIG. 2 is a view showing a method of deciding distribution amounts in a contribution amount mediating system according to a first embodiment of the present disclosure.

A method of deciding the distribution amounts to the respective creators will be described with reference to FIG. 2. FIG. 2 is a view showing the method of deciding the distribution amounts in the contribution amount mediating system 1 according to the first embodiment of the present disclosure.

In the example shown in FIG. 2, content is produced by a plurality of creators. Further, the content is a secondary production and there is parent content. Here, in the present embodiment, the target of contribution made by the user is the creators of the content, the user specifies the amount of contribution to the plurality of creators who produce the content, and the amount of contribution is distributed to the respective creators. Therefore, at a stage where the user specifies the amount of contribution, it can be assumed that the user is specifying the amount of contribution to the content, for convenience sake. In the following description, the content that can be assumed to be the target of contribution made by the user is also called target content.

Referring to FIG. 2, first, the amount of contribution 201 made by the user is divided into a first part A 202A and a second part B 202B on the basis of a certain division ratio. The division ratio can be specified by a creator who registered the content, for example.

Next, the amount corresponding to the first part and the amount corresponding to the second part are distributed on the basis of certain distribution ratios. In the example shown in FIG. 2, on the basis of a first distribution ratio which can be specified by the user, the first part A 202A is distributed into a distributed part A1 203A which is to be distributed to child content (i.e., target content) and a distributed part A2 203B which is to be distributed to parent content. In a similar manner, on the basis of a second distribution ratio which can be specified by the creators, the second part B 202B is distributed into a distributed part B1 203C which is to be distributed to the child content and a distributed part B2 203D which is to be distributed to the parent content.

Next, the distributed parts A1 203A and B1 203C to be distributed to the target content are each further distributed on the basis of certain distribution ratios. In the example shown in FIG. 2, the distributed part A1 203A to be distributed to the target content is distributed into distributed parts A11 204A, A12 204B, and A13 204C to be distributed to the respective creators of the target content, on the basis of the first distribution ratio which can be specified by the user. In a similar manner, the distributed part B1 203C to be distributed to the target content is distributed into distributed parts B11 204D, B12 204E, and B13 204F to be distributed to the respective creators of the target content, on the basis of the second distribution ratio which can be specified by the creators, for example. The sum of A11 204A and B11 204D, the sum of A12 204B and B12 204E, and the sum of A13 204C and B13 204F are distributed to the respective creators of the target content.

In this manner, in the present embodiment, the amount of contribution to the plurality of creators in association with the content is divided into the first part and the second part on the basis of the division ratio specified by the creators, for example, the first part being distributed on the basis of the first distribution ratio, the second part being distributed on the basis of the second distribution ratio. Then, the first part is distributed to the respective creators on the basis of the first distribution ratio, and the second part is distributed to the respective creators on the basis of the second distribution ratio. Here, the first distribution ratio is specified by the user, for example, and the second distribution ratio is specified by the creators, for example. Therefore, in the present embodiment, the distribution of the amount of contribution can reflect the intentions on the user's side and the creators' side more appropriately. Further, in the present embodiment, in a case in which the target content is a secondary production, the first distribution ratio and the second distribution ratio may include a distribution ratio to the parent content. Further, although not shown expressly in the example shown in FIG. 2, the first distribution ratio and the second distribution ratio may include a distribution ratio to the respective creators of the parent content. Accordingly, also in contribution targeting the creators of the parent content, the intentions on the user's side and the creators' side can be reflected more appropriately.

Here, as described above, in the present embodiment, the distribution amounts to the respective creators can be decided on the basis of the amount of contribution, the division ratio, the first distribution ratio, and the second distribution ratio. The amount of contribution, the division ratio, the first distribution ratio, and the second distribution ratio can be said to be conditions for deciding the distribution amounts to the respective creators (hereinafter also referred to as distribution conditions). In the present embodiment, in the distribution conditions, the amount of contribution and the first distribution ratio can be specified by the user. Therefore, the amount of contribution and the first distribution ratio are also referred to as user's side distribution conditions. Further, in the distribution conditions, the division ratio and the second distribution ratio can be specified by the creators. Therefore, the division ratio and the second distribution ratio are also referred to as creators' side distribution conditions.

Note that in the present embodiment, the contribution made by the user to the creators can be made by transferring a virtual currency, a point, and the like, provided by the contribution amount mediating system 1, not by transferring real money. Accordingly, the amount of contribution or the distribution amounts described with reference to FIG. 2 may mean the virtual currency or point, and processes of dividing and distributing the amount of contribution may be processes performed on the virtual currency or point.

[1-2. Processing Procedure in System]

Figure 3:
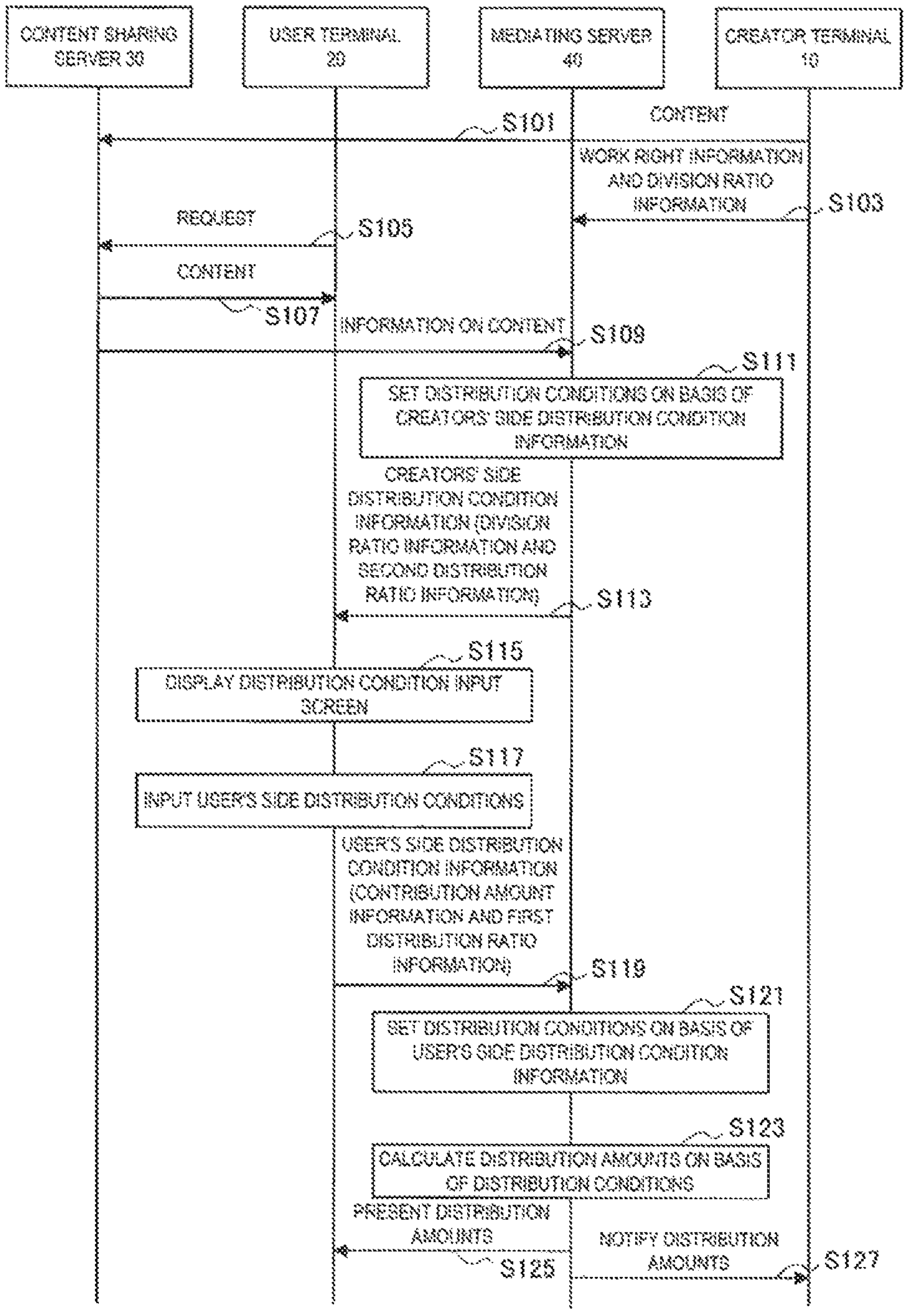
FIG. 3 is a flow chart showing a processing procedure in a contribution amount mediating system according to a first embodiment of the present disclosure.

Next, a processing procedure of various information processes performed in the contribution amount mediating system 1 shown in FIG. 1 will be described with reference to FIG. 3. FIG. 3 is a flow chart showing the processing procedure in the contribution amount mediating system 1 according to the first embodiment of the present disclosure. In FIG. 3, various information processes in the creator terminal 10, the user terminal 20, the content sharing server 30, and the mediating server 40 are shown in chronological order of the processes. Note that information can be transmitted and received between each apparatus through the network 50 shown in FIG. 1 by use of each communication device (not shown in FIG. 1 and FIG. 4 which will be described later) included in each apparatus.

In the contribution amount mediating system 1 according to the present embodiment, first, the creator terminal 10 registers content in the content sharing server 30 (step S101). Also, the creator terminal 10 registers work right information of the content and division ratio information in the mediating server 40 (step S103). The work right information and the division ratio information are in association with the content registered in the step S101. Here, the division ratio information means information on the above described division ratio and can be specified by a creator who registered the content, for example.

Further, the work right information is information on a right relation of the content between or among the creators and at least includes information on the relevance between the content and the creators. For example, the work right information includes information on the creators who have been involved in producing the content. Further, in a case in which the content is a secondary production, the work right information may include information on a citation relation between the content items. For example, the work right information may include information on the parent content of the content and a creator or creators of the parent content. Further, for example, the work right information may include information on child content (i.e., other content produced by citing the target content) based on the content and a creator or creators of the child content. Furthermore, the work right information may include, in addition to the relevance between the content and the creators, information on a distribution ratio to the creators (the above described second distribution ratio), which can be specified by the creator who registered the content. The second distribution ratio may include a distribution ratio to the creators of the parent content and the child content of the target content.

Next, the user terminal 20 transmits a request for content to the content sharing server 30 (step S105). In response to the request, the content sharing server 30 transmits the content desired by the user to the user terminal 20 (step S107). The user can view the content transmitted from the content sharing server 30 via the user terminal 20. In the present embodiment, in the step S107, the user can make a contribution to the creators of the content that is transmitted to the user terminal 20. That is, the content that is transmitted to the user terminal 20 in the step S107 can be the above described target content. Note that in the processes shown in the step S105 and the step S107, processes of transmitting and receiving a request for content and the content in an existing common content sharing system can be applied.

Next, the content sharing server 30 transmits, to the mediating server 40, information on the content that is transmitted to the user terminal 20 in the step S107 (step S109). The information transmitted from the content sharing server 30 to the mediating server 40 in the step S109 can be, for example, information by which the content can be identified, such as the register number attached to the content. In this manner, in the present embodiment, the mediating server 40 does not necessarily store or manage the content, and may identify the target content to which the user can make a contribution by receiving, from the content sharing server 30, the information by which the content can be identified. However, the present embodiment is not limited to this example, and the content sharing system may be included in the contribution amount mediating system 1 and the mediating server 40 may also have the function of the content sharing server 30.

Next, the mediating server 40 sets distribution conditions on the basis of creators' side distribution condition information (i.e., work right information and division ratio information) (step S111). Since the mediating server 40 receives the information on the content in the step S109, the distribution conditions can be set on the basis of the work right information and the division ratio information which are in association with the content. In the step S111, as the distribution conditions, the division ratio and the second distribution ratio, which are the creators' side distribution conditions, are set. Note that the process in the step S111 can be performed by a distribution condition setting unit 421 of the mediating server 40, which will be described later, for example.

Next, the mediating server 40 transmits information on the distribution conditions on the creators' side (the creators' side distribution condition information) to the user terminal 20 (step S113). The creators' side distribution condition information includes, for example, the division ratio information on the division ratio and second distribution ratio information on the second distribution ratio.

Next, the user terminal 20 displays a distribution condition input screen including the received division ratio information and second distribution ratio information (step S115). Further, the user inputs the user's side distribution conditions through the distribution condition input screen (step S117). The user terminal 20 transmits information on the user's side distribution conditions (user's side distribution condition information), inputted by the user, to the mediating server 40 (step S119). The user's side distribution condition information includes, for example, contribution amount information on the amount of contribution and first distribution ratio information on the first distribution ratio. Note that in the following description, the information on the distribution conditions is also referred to as distribution condition information. The distribution condition information can be a concept obtained by combining the user's side distribution condition information with the creators' side distribution condition information.

Here, the distribution condition input screen displayed in the step S115 may be a display screen in a graphical user interface (GUI) through which the user inputs the distribution conditions. The distribution condition input screen displays the division ratio information and the second distribution ratio information, which are the creators' side distribution condition information, and also includes input boxes into which the amount of contribution and the first distribution ratio, which are the user's side distribution conditions, are inputted, for example. The user can input the amount of contribution and the first distribution ratio while referring to the division ratio information and the second distribution ratio information on the distribution condition input screen. Note that the display of the distribution condition input screen may be controlled by a distribution condition input screen display control unit 429 of the mediating server 40, which will be described later, for example. Specific examples of the distribution condition input screen will be described in [1-4. Display Examples of Distribution Condition Input Screen] below in detail.

Next, the mediating server 40 sets the distribution conditions on the basis of the user's side distribution condition information (step S121). In the step S121, as the distribution conditions, the amount of contribution and the first distribution ratio, which are the user's side distribution conditions, are set. Since the creators' side distribution conditions are already set in the step S111, the process in the step S121 sets, as the distribution conditions, the amount of contribution, the division ratio, the first distribution ratio, and the second distribution ratio. Note that the process in the step S121 can be performed by the distribution condition setting unit 421 of the mediating server 40, which will be described later, for example.

The mediating server 40 calculates the distribution amounts to the respective creators on the basis of the set distribution conditions (step S123). Specifically, in the step S123, the distribution amounts to the respective creators may be calculated by use of the method described with reference to FIG. 2. Note that the process shown in the step S123 can be performed by a contribution amount dividing unit 427 and a distribution amount calculating unit 428 of the mediating server 40, which will be described later, for example.

Next, the mediating server 40 presents the user terminal 20 with the calculated distribution amounts to the respective creators (step S125). Specifically, the mediating server 40 can present the distribution amounts by causing the distribution condition input screen to display distribution amount information on the distribution amounts. Here, the user can input the amount of contribution and the first distribution ratio again while referring to the distribution amount information, which is the calculation results, on the distribution condition input screen. That is, in the present embodiment, processes in the step S115 to the step S125 shown in FIG. 3 may be repeated. In this manner, the user can change the subjects to be inputted while referring to the distribution amount information displayed on the distribution condition input screen, thereby deciding the distribution conditions by which desired distribution amounts can be achieved. Further, in the present embodiment, the distribution condition input screen may display the integrated distribution amounts to the respective creators within a certain period. The integrated distribution amounts include distribution amounts of contribution that has been paid by another user. The user can input the distribution conditions while referring to information on the integrated distribution amounts that have been paid to the respective creators so far.

In a case in which the user's side distribution conditions are decided and the distribution amounts to the respective creators are decided, final distribution amounts are notified from the mediating server 40 to the creator terminal 10 (step S127). The creators may be notified of information on the user who made the contribution, a message from the user to the creators, and the like, in addition to the distribution amounts.

The processing procedure of various information processes performed in the contribution amount mediating system 1 has been described above with reference to FIG. 3. As described above, in the present embodiment, on the basis of the user's side distribution condition information and the creators' side distribution condition information, the distribution conditions used for deciding the distribution amounts to the respective creators are set. Accordingly, the distribution of the amount of contribution can reflect the intensions on the user's side and the creators' side more appropriately.

[1-3. Configuration of Apparatus]

Figure 4:
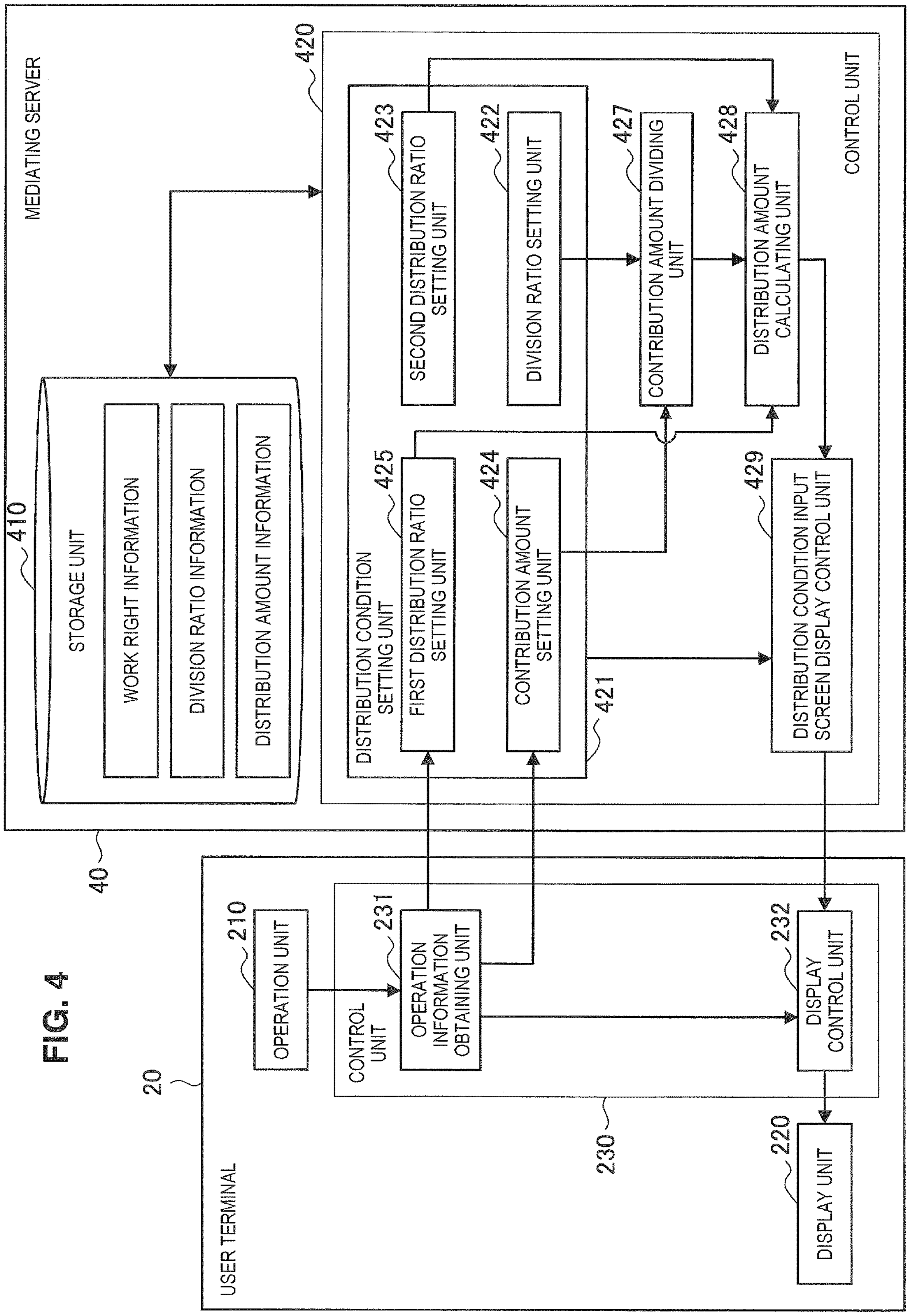
FIG. 4 is a functional block diagram showing functional configurations of apparatuses included in a contribution amount mediating system according to a first embodiment of the present disclosure.

Next, functional configurations of the respective apparatuses included in the contribution amount mediating system 1 according to the first embodiment of the present disclosure will be described with reference to FIG. 4. FIG. 4 is a functional block diagram showing the functional configurations of the respective apparatuses included in the contribution amount mediating system 1 according to the first embodiment of the present disclosure. Note that in FIG. 4, among the apparatuses included in the contribution amount mediating system 1, the creator terminal 10 and the content sharing server 30 are omitted, and only the user terminal 20 and the mediating server 40 are shown. The creator terminal 10 and the content sharing server 30 are configured to be able to perform each process described with reference to FIG. 1 and FIG. 3, and can be achieved by a management server for a common content sharing system or a functional configuration of a common information processing apparatus, for example. Further, the functional configurations shown in FIG. 4 are simplified for the description of the present embodiment, and the respective apparatuses may further include functional configurations that are not shown. Since the functional configurations that are not shown can be known and common functional configurations of the respective apparatuses, a detailed description thereof is omitted here. For example, various pieces of information may be transmitted and received between the user terminal 20 and the mediating server 40 through a wired or wireless network (not shown) by use of a communication device (not shown) included in each apparatus.

First, functional configurations of the user terminal 20 will be described. Referring to FIG. 4, the user terminal 20 includes an operation unit 210, a display unit 220, and a control unit 230.

The operation unit 210 is an input interface to which the user performs various operation inputs. The user can input various pieces of information or instructions to the user terminal 20 via the operation unit 210. The operation unit 210 is formed by any of various input devices such as a mouse, a keyboard, and a touch panel. The operation unit 210 provides operation information, which is information on the operation input performed by the user, to an operation information obtaining unit 231 of the control unit 230, which will be described later.

The display unit 220 is an output interface that visually notifies the user of various pieces of information by displaying the information in various forms such as texts, images, charts, and graphs, on a display screen. The display unit 220 is formed by any of various display devices such as a liquid crystal display (LCD) and an organic electroluminescence (EL) display. Note that in a case in which the operation unit 210 includes a touch panel, the operation unit 210 and the display unit 220 may be integrally formed. In the present embodiment, the display of the display unit 220 is controlled by a display control unit 232 of the control unit 230, which will be described later. For example, the display unit 220 displays the above described distribution condition input screen under control of the display control unit 232. Further, the display unit 220 may display a reproduction screen on which content transmitted from the content sharing server 30 is reproduced under control of the display control unit 232.

The control unit 230 controls a variety of processes performed in the user terminal 20. The control unit 230 includes the operation information obtaining unit 231 and the display control unit 232. Functions of the control unit 230 including functions of the operation information obtaining unit 231 and the display control unit 232 are achieved by a processor such as a central processing unit (CPU) operating in accordance with a program stored in memory, for example.

The operation information obtaining unit 231 obtains operation information which is information on an operation input performed by the user, which is inputted via the operation unit 210. The operation information can include, for example, information indicating operations such as movement and selection of a variety of icons displayed as GUIs or character information inputted by the user. Here, in a case in which the operation unit 210 includes a pointing device such as a mouse, for example, operations such as the movement and selection of a variety of icons displayed as GUIs can be achieved via an operator such as a pointer (cursor) displayed in a GUI. Further, in a case in which the operation unit 210 includes a touch panel, operations such as the movement and selection with respect to icons can be executed directly by touching the icons with a user's finger, for example. In the present embodiment, the operation information obtaining unit 231 obtains, as the operation information, the user's side distribution condition information (e.g., the contribution amount information and the first distribution ratio information) inputted by the user on the distribution condition input screen. The operation information obtaining unit 231 transmits the obtained user's side distribution condition information to the distribution condition setting unit 421 of the mediating server 40, which will be described later. Further, the operation information obtaining unit 231 can obtain information showing that the user has selected one content item from among content items that are registered in the content sharing server 30, and can transmit a request for the selected content item to the content sharing server 30.

The display control unit 232 controls the display unit 220 and causes the display unit 220 to display various pieces of information. In the present embodiment, the display control unit 232 causes the display unit 220 to display the distribution condition input screen. Note that, as described above, the display of the distribution condition input screen can be controlled by the distribution condition input screen display control unit 429 of the mediating server 40, which will be described later. The display control unit 232 can cause the display unit 220 to display the distribution condition input screen on the basis of various pieces of information transmitted from the distribution condition input screen display control unit 429. Further, the display control unit 232 can cause a reproduction screen on which content transmitted from the content sharing server 30 is reproduced to be displayed. Note that the display control unit 232 may further perform display control that is performed in a common information processing apparatus, such as the movement of the display of a pointer in a GUI, on the basis of operation information obtained by the operation information obtaining unit 231, for example.

Next, functional configurations of the mediating server 40 will be described. The mediating server 40 includes a storage unit 410 and a control unit 420.

The storage unit 410 is a storage means that stores various pieces of information to be processed in the mediating server 40. The storage unit 410 stores information to be used in various processes in the control unit 420 and the results of various processes in the control unit 420. The control unit 420 can obtain various pieces of information stored in the storage unit 410 to execute each process by use of the information. The storage unit 410 is formed by any of a variety of storage devices such as a magnetic storage device (e.g., hard disk drive (HDD)), a semiconductor storage device, and an optical storage device. In the present embodiment, the storage unit 410 stores the work right information and the division ratio information. Further, the storage unit 410 may store information on distribution amounts that are paid to the respective creators within a certain period as history. The work right information and the division ratio information can be stored in association with the content registered in the content sharing server 30 by a creator through the creator terminal 10, for example. Further, the history of the distribution amount information to the respective creators can be stored by the results of calculation by the distribution amount calculating unit 428, which will be described later, being accumulated for a certain period. Note that the present embodiment is not limited to this example, and the work right information may reflect information from a user who has viewed the content, for example. In a case in which the work right information is registered by the creators and/or the user, the contribution amount mediating system 1 and/or a provider of the content sharing system may verify the validity of the subject thereof.

The control unit 420 controls a variety of processes performed in the mediating server 40. The control unit 420 includes the distribution condition setting unit 421, the contribution amount dividing unit 427, the distribution amount calculating unit 428, and the distribution condition input screen display control unit 429. Functions of the control unit 420 including these functions are achieved by a processor such as a CPU operating in accordance with a program stored in memory.

The distribution condition input screen display control unit 429 controls the display of the distribution condition input screen displayed on the display unit 220 of the user terminal 20. Specifically, the distribution condition input screen display control unit 429 controls the display of the distribution condition input screen via the display control unit 232 by transmitting various pieces of information that can be displayed on the distribution condition input screen to the display control unit 232 of the user terminal 20. Various pieces of information that can be displayed on the distribution condition input screen may be, for example, the distribution condition information and the distribution amount information. In this manner, in the present embodiment, the distribution condition input screen display control unit 429 can be said to control the display of the distribution condition information and the distribution amount information on the distribution condition input screen.

The distribution condition setting unit 421 sets distribution conditions which are conditions for deciding the distribution amounts to the respective creators. In the present embodiment, functions of the distribution condition setting unit 421 can be further subdivided. As shown in FIG. 4, the distribution condition setting unit 421 includes a division ratio setting unit 422, a second distribution ratio setting unit 423, a contribution amount setting unit 424, and a first distribution ratio setting unit 425.

The division ratio setting unit 422 and the second distribution ratio setting unit 423 set the creators' side distribution conditions. The division ratio setting unit 422 sets the division ratio for the target content to which the user can make a contribution, on the basis of the division ratio information stored in the storage unit 410. The second distribution ratio setting unit 423 sets the second distribution ratio for the target content on the basis of the work right information stored in the storage unit 410. Here, as described above with reference to FIG. 3, the work right information may include information on the citation relation between the target content and other content, and may include information on the distribution ratio for the other content (e.g., parent content of the target content) that is in the citation relation with the target content. The second distribution ratio setting unit 423 can set the second distribution ratio in addition to the distribution ratio for the other content that is in the citation relation with the target content, such as the parent content, on the basis of such information included in the work right information. Note that the second distribution ratio setting unit 423 may set the second distribution ratio in addition to the distribution ratio to the respective creators of the other content that is in the citation relation with the target content, such as the parent content, in more detail.

Here, as described above with reference to FIG. 3, information on the content transmitted from the content sharing server 30 to the user terminal 20 in response to the user's request may be transmitted from the content sharing server 30 to the mediating server 40. On the basis of information on the content, the division ratio setting unit 422 and the second distribution ratio setting unit 423 may set the division ratio and the second distribution ratio for the target content by referring to the division ratio information and the work right information which are in association with the content from among pieces of information stored in the storage unit 410.

Note that in the example shown in FIG. 4, the work right information is stored in the storage unit 410 of the mediating server 40; however, the present embodiment is not limited to this example. The work right information may exist as an external database of the contribution amount mediating system 1 according to the present embodiment. It is possible to obtain necessary information for setting the distribution conditions by accessing the database of the work right information. Further, as described above, the work right information is information on the right relation between or among the creators of the content. Accordingly, in a case in which the right relation of the content is established as a database by a copyright collective, for example, information of the database may be used as the work right information.

The distribution condition setting unit 421 can provide information on the set distribution conditions to the distribution condition input screen display control unit 429 at any time. Also, the distribution condition input screen display control unit 429 can reflect the provided information on the distribution condition input screen at any time. For example, the division ratio setting unit 422 and the second distribution ratio setting unit 423 provide information on the set division ratio and second distribution ratio to the distribution condition input screen display control unit 429. The distribution condition input screen display control unit 429 transmits the division ratio information and the second distribution ratio information to the display control unit 232 of the user terminal 20 and causes the distribution condition input screen to display the information. The user can refer to the distribution condition input screen displaying the division ratio information and the second distribution ratio information and can input the user's side distribution conditions. Further, in a case in which the target content is a secondary production, the distribution condition input screen may display information on the other content (e.g., parent content of the target content) that is in the citation relation with the target content to notify the user.

The contribution amount setting unit 424 and the first distribution ratio setting unit 425 set the user's side distribution conditions. The contribution amount setting unit 424 sets the amount of contribution to the creators of the target content on the basis of the operation information transmitted from the operation information obtaining unit 231 of the user terminal 20. The first distribution ratio setting unit 425 sets the first distribution ratio for the target content on the basis of the operation information transmitted from the operation information obtaining unit 231 of the user terminal 20. Here, the operation information transmitted from the operation information obtaining unit 231 may be information on the amount of contribution and the first distribution ratio, which are inputted by the user into input boxes for the contribution amount information and the first distribution ratio information on the distribution condition input screen displayed on the display unit 220 of the user terminal 20. Here, an input box for the distribution conditions may include an input box into which the distribution ratio for the other content (e.g., parent content of the target content) that is in the citation relation with the target content is inputted. The first distribution ratio setting unit 425 may set the first distribution ratio in addition to the distribution ratio for the other content that is in the citation relation with the target content, such as the parent content, on the basis of an operation input performed by the user into the input box. Further, the first distribution ratio setting unit 425 may set the first distribution ratio in addition to the distribution ratio to the respective creators of the other content that is in the citation relation with the target content, such as the parent content, in more detail.

The contribution amount setting unit 424 and the first distribution ratio setting unit 425 provide the information on the set amount of contribution and first distribution ratio to the distribution condition input screen display control unit 429. In a similar manner to that of the division ratio information and the second distribution ratio information, the distribution condition input screen display control unit 429 reflects the contribution amount information and the first distribution ratio information on the distribution condition input screen at any time.

The division ratio setting unit 422 and the contribution amount setting unit 424 provide information on the set division ratio and amount of contribution to the contribution amount dividing unit 427. Further, the first distribution ratio setting unit 425 and the second distribution ratio setting unit 423 provide information on the set first distribution ratio and second distribution ratio to the distribution amount calculating unit 428.

The contribution amount dividing unit 427 divides the amount of contribution set by the contribution amount setting unit 424 into the first part and the second part on the basis of the division ratio set by the division ratio setting unit 422, the first part being distributed on the basis of the first distribution ratio, the second part being distributed on the basis of the second distribution ratio. The process in the contribution amount dividing unit 427 corresponds to the process of dividing the amount of contribution into the first part A and the second part B, the process being described above with reference to FIG. 2. The contribution amount dividing unit 427 provides information on the divided the first part and second part to the distribution amount calculating unit 428.

The distribution amount calculating unit 428 calculates the distribution amounts of contribution to the respective creators on the basis of the amount corresponding to the first part, the amount corresponding to the second part, the first distribution ratio, and the second distribution ratio. Specifically, the distribution amount calculating unit 428 distributes the amount corresponding to the first part to the respective creators on the basis of the first distribution ratio, and distributes the amount corresponding to the second part to the respective creators on the basis of the second distribution ratio, thereby calculating the distribution amounts to the respective creators. Further, in the present embodiment, in a case in which the target content is a secondary production, the first distribution ratio and the second distribution ratio may include not only the distribution ratio to the creators who have produced the target content but also the distribution ratio to the creators who have produced the parent content of the target content. In this manner, on the basis of the first distribution ratio and the second distribution ratio, the distribution amount calculating unit 428 may calculate the distribution ratio to the creators including the creators of the parent content. The process in the distribution amount calculating unit 428 corresponds to the process of distributing the first part A and the second part B of the amount of contribution into the distributed parts A1 and B1 to the target content and the distributed parts A2 and B2 to the parent content, and also the process of distributing the distributed parts A1 and B1 to the target content into the distributed parts A11, A12, A13, B11, B12, and B13 to the respective creators, the processes being described above with reference to FIG. 2.

The distribution amount calculating unit 428 provides the distribution amount information on the calculated distribution amounts to the respective creators to the distribution condition input screen display control unit 429. The distribution condition input screen display control unit 429 can cause the distribution condition input screen to display the distribution amount information at any time. Therefore, when the distribution conditions are changed, the distribution amount information displayed on the distribution condition input screen is updated. By referring to the distribution condition input screen, the user can check the distribution amounts to the respective creators in accordance with the distribution conditions in real time. Further, the distribution amount calculating unit 428 may store the distribution amount information in the storage unit 410. The storage unit 410 can store the distribution amount information in association with the creators for a certain period. By referring to the storage unit 410, the distribution condition input screen display control unit 429 may cause the distribution condition input screen to display the integrated distribution amounts to the respective creators within a certain period.

The functional configurations of the respective apparatuses included in the contribution amount mediating system 1 according to the first embodiment of the present disclosure have been described above with reference to FIG. 4. As described above, in the first embodiment, on the basis of the distribution ratio which can be specified by the user and the distribution ratio which can be specified by the creators, the distribution amounts of contribution to the respective creators are calculated. Therefore, the distribution of the amount of contribution reflects the intentions on both the user's side and the creator's side appropriately. Further, in the present embodiment, in a case in which the target content is a secondary production, the amount of contribution may be distributed to the respective creators in consideration of the distribution ratios to the target content and the original content. In this manner, it is possible to decide appropriate distribution amounts to the creators of the original content in a manner that mediation between the intentions on the user's side and the creators' side is accepted.

[1-4. Display Examples of Distribution Condition Input Screen]

Figure 5:
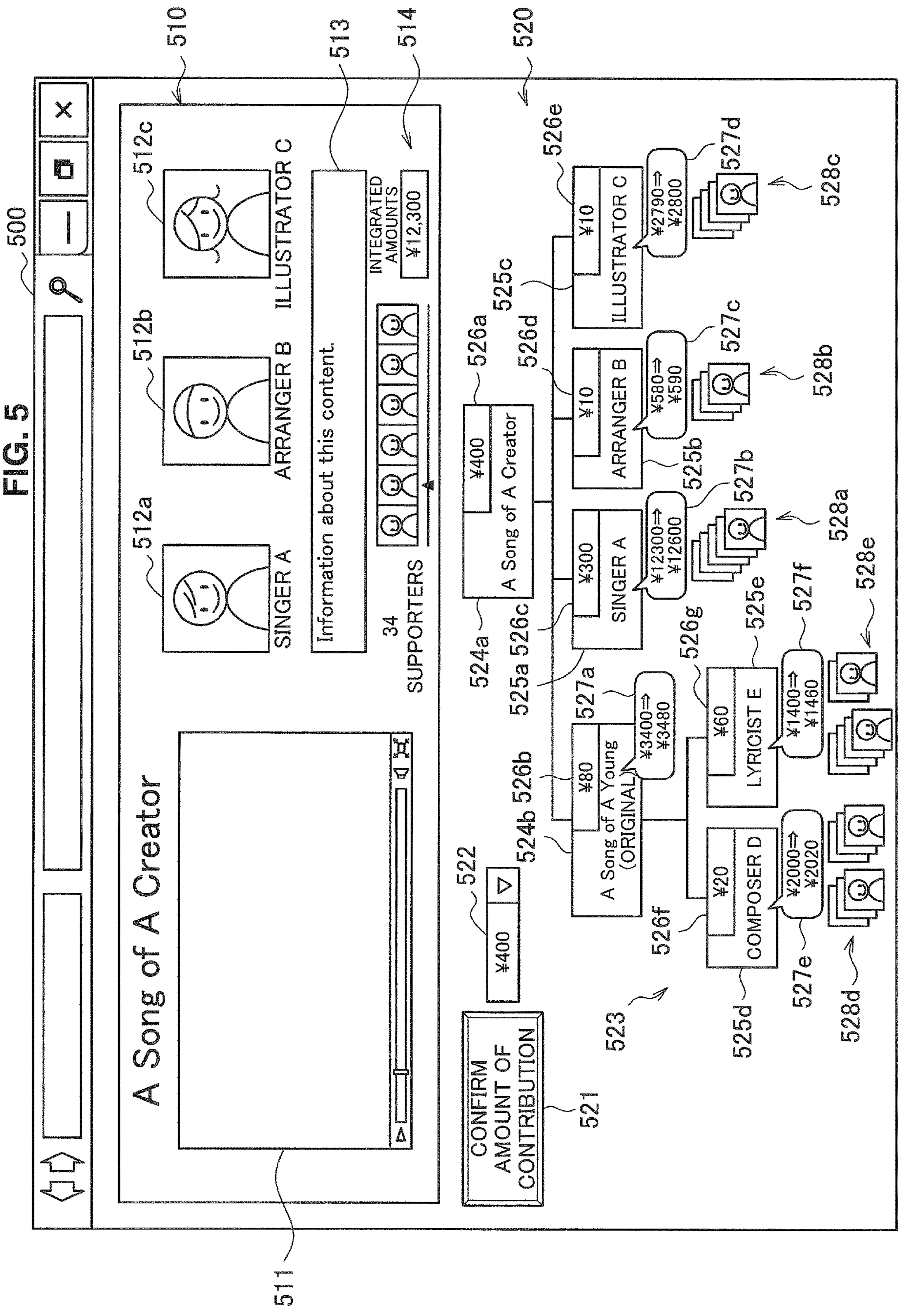
FIG. 5 shows a display example of a distribution condition input screen according to a first embodiment of the present disclosure.

Next, display examples of the distribution condition input screen according to the first embodiment of the present disclosure will be described with reference to FIG. 5 and FIGS. 6A and 6B. FIG. 5 shows a display example of the distribution condition input screen according to the first embodiment of the present disclosure. Note that the following display of the distribution condition input screen can be controlled by the above described distribution condition input screen display control unit 429.

Referring to FIG. 5, a distribution condition input screen 500 includes a content reproduction area 510 and a distribution condition information display area 520. In the content reproduction area 510, an image of the reproduced content and various pieces of information related to the content are displayed. In the present embodiment, the reproduced content in the content reproduction area 510 can be the target content. In the example shown in FIG. 5, in the content reproduction area 510, a content image 511, creator information 512*a* to 512*c*, a comment box 513, and integrated distribution amount information 514 are displayed.

The content image 511 is an image of the content transmitted from the content sharing server 30 to the user terminal 20 in response to the user's request. In a case in which the content does not include an image, such as music content, as the content image 511, for example, an image corresponding to the music content may be provided from the content sharing server 30 to be displayed or a visual effect image generated in the content sharing server 30 or the user terminal 20 may be displayed. Alternatively, the content reproduction area 510 may not include the content image 511.

The creator information 512*a* to 512*c* is information on the creators of the target content. In the example shown in FIG. 5, the target content is moving image content accompanying music, which is sung by a singer A and arranged by an arranger B, image of which is produced by an illustrator C. Therefore, as the creator information 512*a* to 512*c*, images representing the singer A, the arranger B, and the illustrator C along with the names of the respective creators are displayed.

The comment box 513 displays comments posted by the creators with respect to the content. The comment may include self-introductions of the creators, general explanation of the content, and information on other content related to the target content (e.g., a link to the other content produced by the creators).

The integrated distribution amount information 514 is information on the integrated distribution amounts that are distributed to the creators within a certain period. Further, the integrated distribution amount information 514 may include information on users (supporters) who have made contributions to the creators. The integrated distribution amount information 514 can be displayed on the basis of the history of the distribution amount information stored in the storage unit 410, for example. The example shown in FIG. 5 displays the integrated distribution amounts to the singer A being ¥12,300, icons representing supporters of the singer A, and the supporters of the singer A being 34 in number.

In the distribution condition information display area 520, the distribution condition information is displayed. In the example shown in FIG. 5, the distribution condition information display area 520 displays a distribution condition confirmation button 521, a contribution amount input box 522, and work right information 523.

The distribution condition confirmation button 521 is a GUI component for inputting information showing the confirmation of the distribution conditions to the user terminal 20, and can be selected by a touch by an operator such as a pointer, a user's finger, or the like in accordance with a user's operation. The selection of the distribution condition confirmation button 521 confirms the distribution conditions that have been inputted by the user, and on the basis of the distribution conditions, final distribution amounts to the respective creators are decided.

Into the contribution amount input box 522, the amount of contribution is inputted in accordance with a user's operation input. Information on the amount of contribution inputted into the contribution amount input box 522 is transmitted as the operation information to the contribution amount setting unit 424 of the mediating server 40.

The work right information 523 can be displayed on the basis of the work right information 523 stored in the storage unit 410, for example. In the example shown in FIG. 5, the work right information 523 is displayed in a form of a tree diagram showing the relevance between the content and the creators. At portions corresponding to nodes of the tree diagram, content icons 524*a* and 524*b* and creator icons 525*a* to 525*e* are displayed.

The content icons 524*a* and 524*b* are each an icon representing content, and can be formed by the tile of the content, a thumbnail of the content, or the like. For example, the content icon 524*a* represents the content reproduced in the content reproduction area 510, and the content icon 524*b* represents the parent content of the content reproduced in the content reproduction area 510. The content icon 524*a* is connected to the content icon 524*b* by a link. In this manner, in the present embodiment, as the work right information 523, the citation relation between content items can be displayed as a link. Further, the selection of the content icon 524*b*, for example, causes the content corresponding to the content icon 524*b* to be transmitted from the content sharing server 30 to the user terminal 20, and the content may be reproduced in the user terminal 20.

The creator icons 525*a* to 525*e* are each an icon representing a creator, and can be formed by the name of the creator, an image representing the creator, or the like. In the example shown in FIG. 5, the creator icons 525*a* to 525*c* show the creators of the content reproduced in the content reproduction area 510 (i.e., creators corresponding to creator information 512*a* to 512*c* displayed in the content reproduction area 510), and are each connected to the content icon 524*a* by a link. The creator icons 525*d* and 525*e* represent creators of the parent content of the content reproduced in the content reproduction area 510, and are each connected to the content icon 524*b* by a link. In this manner, in the present embodiment, the relevance between the content and the creators can be displayed as a link between icons. Further, for example, the selection of any of the creator icons 525*a* to 525*e* may cause information on the creator corresponding to a creator icon (e.g., profile or work list of the creator) selected from among the creator icons 525*a* to 525*e* to be displayed.

Further, in the distribution condition information display area 520, distribution amount information 526*a* to 526*g* to the respective creators is displayed in association with the content icons 524*a* and 524*b* and the creator icons 525*a* to 525*e*. In the example shown in FIG. 5, the distribution amount information 526*a* to 526*g* is displayed to be superimposed on the content icons 524*a* and 524*b* and the creator icons 525*a* to 525*e*. The distribution amount information 526*a* to 526*g* is information on the distribution amounts calculated by the above described distribution amount calculating unit 428, and is information on the distribution amounts calculated on the basis of the amount of contribution inputted into the contribution amount input box 522 and the other distribution conditions. In a case in which the distribution conditions including the input values into the contribution amount input box 522 are changed, the display of the distribution amount information 526*a* to 526*g* may be changed dynamically.

In a manner similar to that of the integrated distribution amount information 514 displayed on the content reproduction area 510, integrated distribution amount information 527*a* to 527*f* to the respective creators may be displayed in association with the content icon 524*b* and the creator icons 525*a* to 525*e*. Further, as the integrated distribution amount information 527*a* to 527*f*, increments of integrated distribution amounts based on the distribution amount information 526*a* to 526*g* may be displayed. In the example shown in FIG. 5, in balloon boxes displayed in association with the content icon 524*b* and the creator icons 525*a* to 525*e*, information on the increments based on the integrated distribution amount information 527*a* to 527*f* and the distribution amount information 526*a* to 526*g* is displayed. Note that although omitted in FIG. 5, integrated distribution amount information of the content icon 524*a* may be displayed similarly.

Here, in the present embodiment, the target of the contribution made by the user is the creators. Accordingly, the distribution amount information 526*a* displayed in association with the content icon 524*a* may be the total distribution amounts (i.e., the amount of contribution) to the respective creators related to the content corresponding to the content icon 524*a*. Further, the distribution amount information 526*b* and the integrated distribution amount information 527*a* displayed in association with the content icon 524*b* may be sum of the distribution amounts and the integrated distribution amounts the respective creators related to the content corresponding to the content icon 524*b*.

Further, in the distribution condition information display area 520, supporter icons 528*a* to 528*e* representing the users who have made contributions are displayed in association with the creator icons 525*a* to 525*e*. As shown in FIG. 5, the supporter icons 528*a* to 528*e* can be aggregates of a plurality of user icons representing the users who have made contributions. The more user icons forming supporter icons 528*a* to 528*e*, the more users have made contributions to the creator. Accordingly, the supporter icons 528*a* to 528*e* can be indices indicating the degree of popularity of the creator.

In this manner, in the distribution condition input screen 500 according to the present embodiment, the display of the integrated distribution amount information 514 and 527*a* to 527*f* to the respective creators visualizes support actions that have been made to the respective creators. In addition, as the integrated distribution amount information 514 and 527*a* to 527*f*, the display of increments to be generated by the current contribution visualizes the effects of the support that the user is about to make to the respective creators. In this manner, the display of information that promotes user's supports can increase the user's motivation to the contribution action.

Here, a distribution ratio input screen to which the user inputs the first distribution ratio will be described with reference to FIGS. 6A and 6B. FIGS. 6A and 6B each show a display example of the distribution ratio input screen 530 according to the first embodiment of the present disclosure. Note that the distribution ratio input screen 530 shown in each of FIGS. 6A and 6B can be said to be one of distribution condition input screens to which the distribution conditions are inputted. The distribution ratio input screen 530 may be displayed on the distribution condition information display area 520 shown in FIG. 5, for example. Alternatively, the distribution ratio input screen 530 may be displayed in an area that is different from the display screen of the display unit 220 as a different screen from the distribution condition input screen 500 shown in FIG. 5.

Figure 6A:
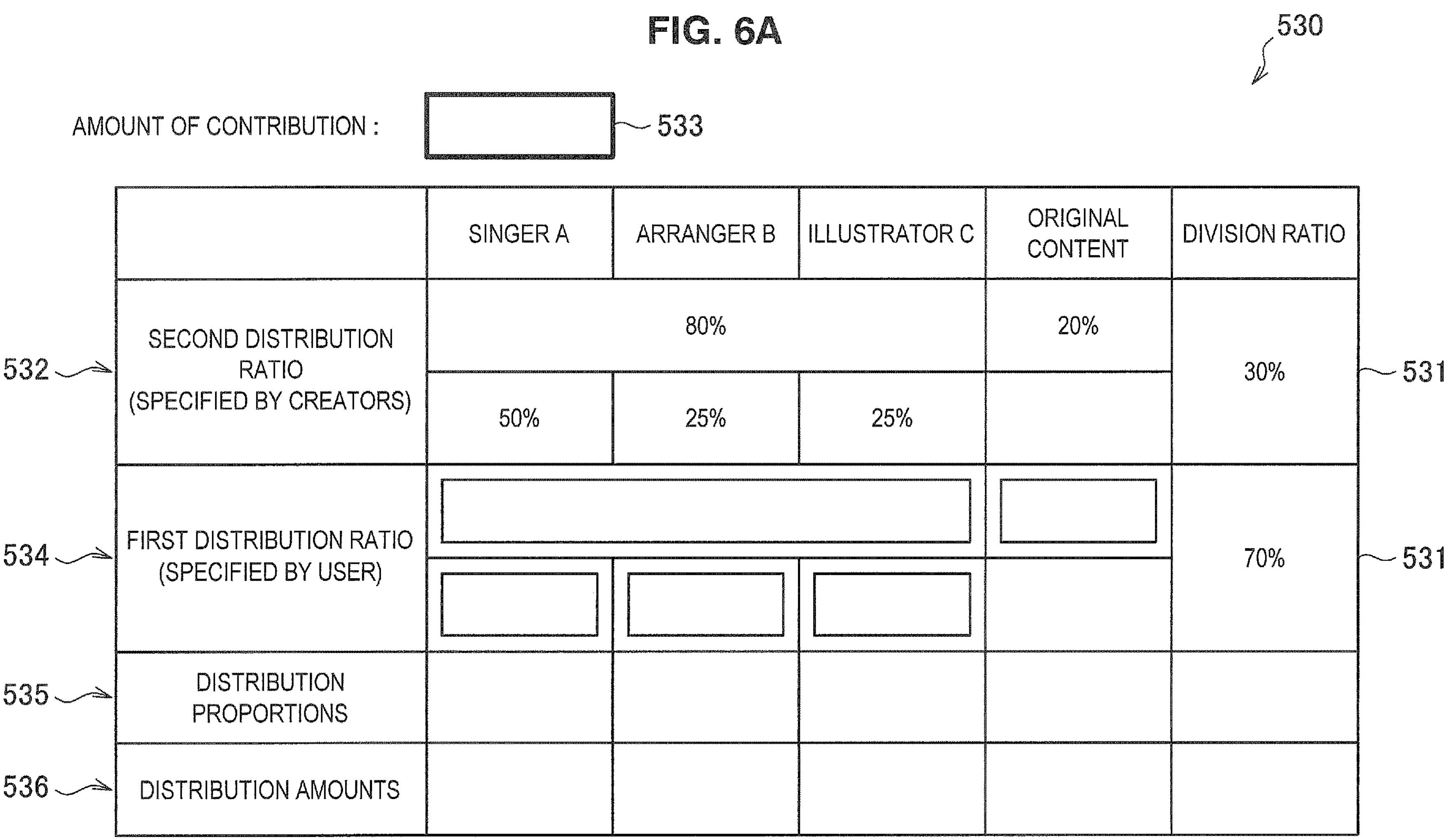
FIG. 6A shows a display example of a distribution ratio input screen according to a first embodiment of the present disclosure.

Referring to FIG. 6A, in a distribution ratio input screen 530, the distribution condition information and the distribution amount information are displayed in a form of a table. In the example shown in FIG. 6A, the division ratio information, the contribution amount information, the first distribution ratio information, the second distribution ratio information, and the distribution amount information are displayed in the form of a table.

Specifically, the distribution ratio input screen 530 includes a division ratio display box 531 in which the division ratio information is displayed and a second distribution ratio display box 532 in which the second distribution ratio information is displayed. In the division ratio display box 531 and the second distribution ratio display box 532, information on the creators' side distribution conditions set by the division ratio setting unit 422 and the second distribution ratio setting unit 423 are displayed. In the present embodiment, since the division ratio and the second distribution ratio are the distribution conditions which can be specified by the creators, it is not possible to change the display in the division ratio display box 531 and the second distribution ratio display box 532 by user's operations.

The distribution ratio input screen 530 also includes a contribution amount input box 533 for inputting the amount of contribution and a first distribution ratio input box 534 for inputting the first distribution ratio. Into the contribution amount input box 533 and the first distribution ratio input box 534, desired values can be inputted in accordance with a user's operation.

The distribution ratio input screen 530 also includes a distribution proportion display box 535 which shows distribution proportions to the respective creators and a distribution amount display box 536 which shows the distribution amounts to the respective creators. In the example shown in FIG. 6A, since the user's side distribution conditions are not inputted yet and the contribution amount input box 533 and the first distribution ratio input box 534 are blank, the distribution proportion display box 535 and the distribution amount display box 536 are also blank.

FIG. 6B shows a display example of the distribution ratio input screen 530 in a case in which the user inputs the amount of contribution and the first distribution ratio into the contribution amount input box 533 and the first distribution ratio input box 534 in the state shown in FIG. 6A. In the example shown in FIG. 6B, a case in which one hundred yen is inputted as the amount of contribution is shown for simplicity. Information on the inputted amount of contribution and first distribution ratio is transmitted to the mediating server 40 and the distribution amounts to the respective creators are calculated by the distribution amount calculating unit 428 of the mediating server 40. In FIG. 6B, information on the distribution amounts calculated by the distribution amount calculating unit 428 and proportions thereof is displayed in the distribution amount display box 536 and the distribution proportion display box 535. A change in the input value into the contribution amount input box 533 and the first distribution ratio input box 534 can change dynamically the display in the distribution proportion display box 535 and the distribution amount display box 536.

Display examples of the distribution condition input screen according to the first embodiment of the present disclosure have been described above with reference to FIG. 5 and FIGS. 6A and 6B. As described above, in the present embodiment, the distribution condition information and the distribution amount information are displayed on the distribution condition input screen 500 and the distribution amount information can be updated on the basis of the change in the distribution condition information at any time. Accordingly, the user can change the distribution conditions to be inputted while checking the distribution amount information, and can confirm the final distribution conditions. Further, in the present embodiment, the work right information 523 can be displayed on the distribution condition input screen 500. The work right information 523 is displayed in a form of a tree diagram showing the relevance between the content and the creators, for example. In addition, at portions corresponding to nodes of the tree diagram, the content icons 524*a* and 524*b* and the creator icons 525*a* to 525*e* are displayed, and the distribution amount information can be displayed in association with these icons. Accordingly, the distribution amounts to the respective creators can be notified to the user so that the user can recognize the distribution amounts more intuitively.

Note that, as shown in FIGS. 6A and 6B, in the present embodiment, the user inputs the first distribution ratio when making a contribution. Further, as described above, the creators input the second distribution ratio in a form included in the work right information 523, for example, when registering the content. Here, in the present embodiment, default values may be set as the first distribution ratio and the second distribution ratio, and the user and the creators may use the default values when inputting the first distribution ratio and the second distribution ratio. It may bother the user and the creators to input the first distribution ratio and the second distribution ratio every time the user makes a contribution or the creators register content, for example. Accordingly, setting the default values in advance as described above makes it easier for the user and the creators to input the distribution conditions.

Further, the default values of the first distribution ratio and the second distribution ratio may be set as appropriate in accordance with a pattern of producing the content, the number of creators of the content, and the like. For example, in a case in which the target content is a secondary production produced by another singer singing certain music content which is the original content, or in a case in which the target content is a secondary production produced by attaching an image to certain music content which is the original content, in particular, the content which is a secondary production may highly possibly have a typical, frequently used pattern of secondary production of the content. For content that is produced using such a typical production pattern, in accordance with the production pattern, the default values of the first distribution ratio and the second distribution ratio may be set as appropriate. The user and the creators can refer to the default values or use the default values to set the first distribution ratio and the second distribution ratio.

Figure 7:
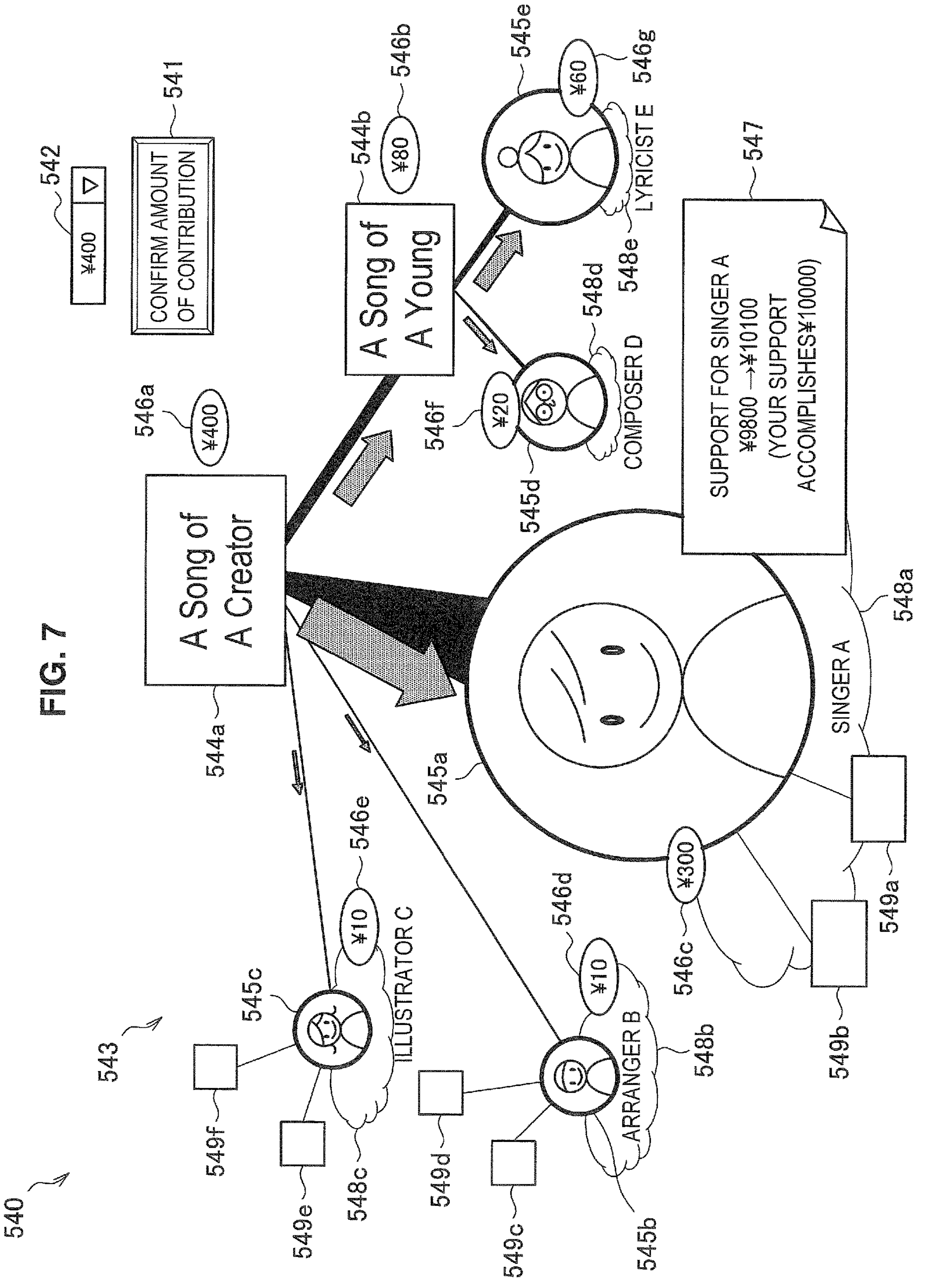
FIG. 7 shows a modification example of a distribution condition information display area shown in FIG. 5.

Here, modification examples of the distribution condition information display area 520 shown in FIG. 5 will be described with reference to FIG. 7. FIG. 7 shows a modification example of the distribution condition information display area 520 shown in FIG. 5.

Referring to FIG. 7, in a distribution condition information display area 540 according to this modification example, a distribution condition confirmation button 541, a contribution amount input box 542, and work right information 543 are displayed. Here, since the distribution condition confirmation button 541 and the contribution amount input box 542 are the same as the distribution condition confirmation button 521 and the contribution amount input box 522 which are shown in FIG. 5, a detailed description thereof is omitted.

Referring to FIG. 7, in this modification example, as in FIG. 5, the work right information 543 is displayed in a form of a tree diagram showing the relevance between the content and the creators. At portions corresponding to nodes of the tree diagram, the content icons 544*a* and 544*b* and the creator icons 545*a* to 545*e* are displayed. The content icons 544*a* and 544*b* are each an icon representing the content, and correspond to the content icons 524*a* and 524*b* shown in FIG. 5, respectively. Further, the creator icons 545*a* to 545*e* are each an icon representing a creator, and correspond to the creator icons 545*a* to 545*e* shown in FIG. 5, respectively. Further, as in FIG. 5, the relevance between the content and the creators and the relevance between the content and the content are displayed as links between the content icons 544*a* and 544*b* and the creator icons 545*a* to 545*e*. Further, distribution amount information 546*a* to 546*g* to the respective creators is displayed in association with the content icons 544*a* and 544*b* and the creator icons 545*a* to 545*e*. The distribution amount information 546*a* to 546*g* corresponds to the distribution amount information 526*a* to 526*g* shown in FIG. 5.

In this modification example, unlike in the case shown in FIG. 5 as an example, the content icons 544*a* and 544*b* and the creator icons 545*a* to 545*e* and the links therebetween are displayed in sizes in accordance with the distribution amounts to the respective creators. In the example shown in FIG. 7, the amount of contribution that is inputted into the contribution amount input box 542 is four hundred yen, and three hundred yen therefrom is distributed to the singer A. Further, ten yen is distributed to each of the arranger B and the illustrator C. Therefore, the creator icon 545*a* representing the singer A is displayed largely compared with the creator icons 545*b* and 545*c* representing the arranger B and the illustrator C. In addition, the link from the content icon 544*a* representing the target content to the creator icon 545*a* representing the singer A is displayed thickly compared with links from the content icon 544*a* to the creator icons 545*b* and 545*c* representing the arranger B and the illustrator C. In this manner, the content icons 544*a* and 544*b* and the creator icons 545*a* to 545*e* and the links therebetween are displayed in sizes in accordance with the distribution amounts to the respective creators, and accordingly, the user can more intuitively recognize the magnitude of the distribution amounts to the respective creators, increasing the user's convenience when inputting the distribution conditions.

Further, in this modification example, a message box 547 displaying integrated distribution amount information to a specific creator is displayed. In the example shown in FIG. 7, the integrated distribution amount information to the singer A is displayed in the message box 547. As shown in FIG. 7, the message box 547 may display how much the integrated amounts of contribution is with respect to the singer A, including the current contribution. In this manner, the display of a specific value of the integrated amounts of contribution to the creator in the message box 547 increases the user's motivation to make a contribution.

In this modification example, as backgrounds of the creator icons 545*a* to 545*e*, cloud backgrounds 548*a* to 548*e* are displayed, respectively. The backgrounds 548*a* to 548*e* represent the number of supporters conceptually. For example, the more the supporters, the more largely the backgrounds 548*a* to 548*e* are displayed. Further, the color, the pattern, or the like of the backgrounds 548*a* to 548*e* may change depending on the number of supporters. Here, in the example shown in FIG. 5, the supporters are displayed as the supporter icons 528*a* to 528*e* which are aggregates of a plurality of user icons. Therefore, the number of supporters is shown as the number of user icons forming the supporter icons 528*a* to 528*e*. Meanwhile, in this modification example, the number of supporters is shown by the size, color, or the like of the backgrounds 548*a* to 548*e*. This makes it possible for the user to recognize the number of supporters more intuitively. As described above, since the number of supporters can be an index indicating the degree of popularity of the creator, in this modification example, the degree of popularity of the creator can be transferred to the user more intuitively.

Further, in this modification example, as shown in FIG. 7, content icons 549*a* to 549*f* representing other content are displayed with respect to the creator icons 545*a* to 545*c*. In the example shown in FIG. 7, links are displayed between the creator icon 545*a* and the content icons 549*a* and 549*b*, between the creator icon 545*b* and the content icons 549*c* and 549*d*, and between the creator icon 545*c* and the content icons 549*e* and 549*f*, so that the relevance therebetween are shown. For example, content items represented by the content icons 549*a* and 549*b* are other content items the production of which has involved the creator (i.e., the singer A) represented by the creator icon 545*a*. In a similar manner, content items represented by the content icons 549*c* to 549*f* may be other content items the production of which has involved the creators (i.e., the arranger B and the illustrator C) represented by the creator icons 545*b* and 545*c*. For example, the selection of the content icons 549*a* to 549*f* may cause content corresponding to the selected content icons 549*a* to 549*f* to be transmitted from the content sharing server 30 to the user terminal 20 so that the content can be reproduced in the user terminal 20. Note that in the example shown in FIG. 7, the content icons 549*a* to 549*f* are each illustrated by a square frame for simplicity; however, the content icons 549*a* to 549*f* may each display the title, a thumbnail, or the like of the content.

In this manner, in this modification example, as the work right information 543, information on content other than the target content related to the creators may be displayed. Here, the user who has made a contribution to the creators is assumed to be in favor of works made by the creators, and may be highly possibly keen to view other works made by the creators. Accordingly, the display of information on the other content related to the creators makes it possible for the user to easily access the other content made by the creators. The user who views the other content is assumed to make a contribution to the creators again. In this manner, in this modification example, the user is provided with information on the other content related to the creators, and accordingly, the user can be promoted to make another contribution action.

2. Second Embodiment

Next, a second embodiment of the present disclosure will be described. The second embodiment of the present disclosure corresponds to an embodiment in which the setting of the distribution conditions is different from that in the first embodiment. Specifically, in the second embodiment, the user's side distribution conditions which can be specified by the user are different from those in the first embodiment. Therefore, in the following description of the second embodiment, different points from the first embodiment will be described mainly, and a description of the same points as the first embodiment will be omitted.

[2-1. Processing Procedure in System]

Figure 8:
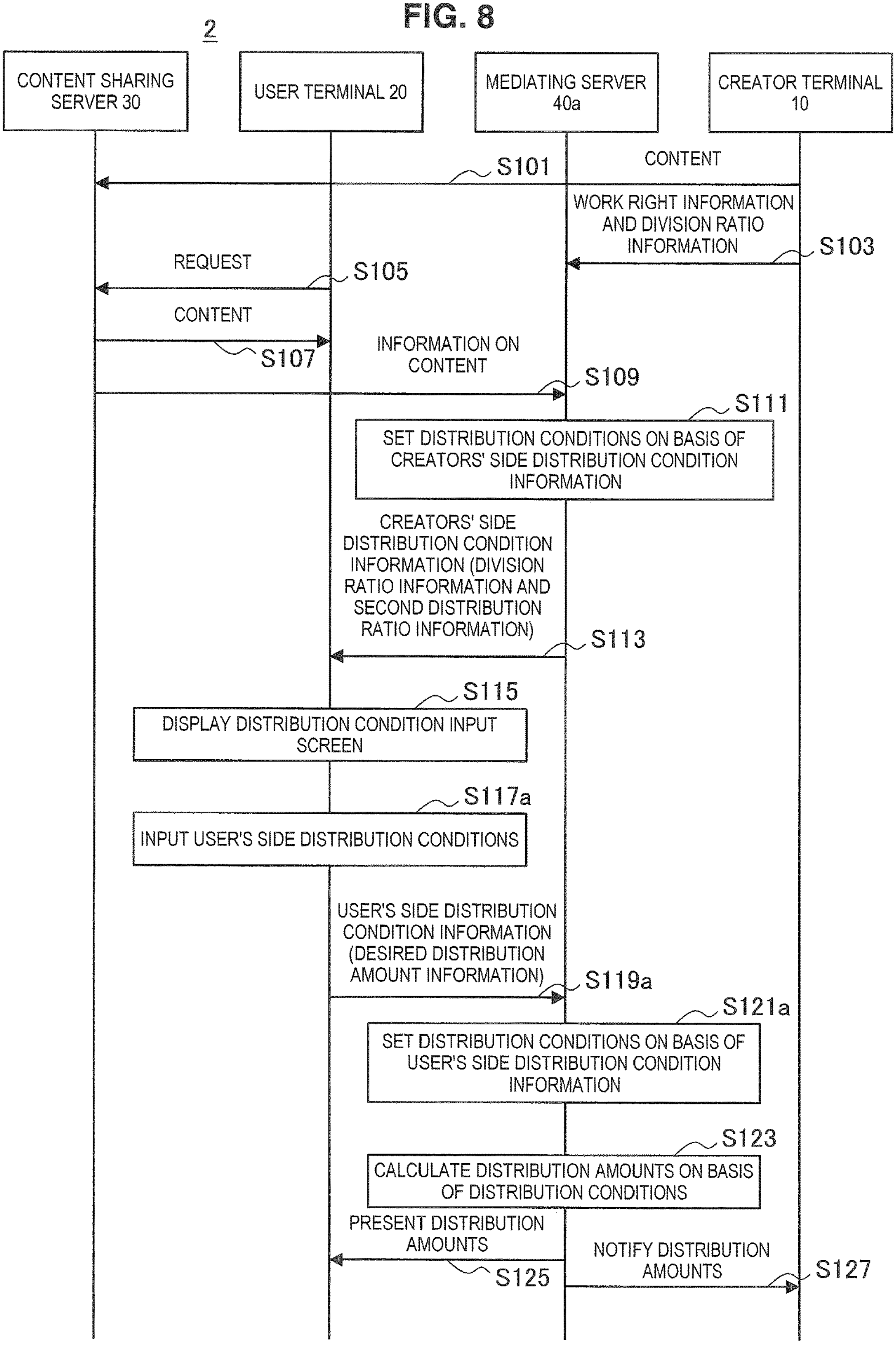
FIG. 8 is a flow chart showing a processing procedure in a contribution amount mediating system according to a second embodiment of the present disclosure.

First, a processing procedure of various kinds of information processing performed in a contribution amount mediating system according to the second embodiment of the present disclosure will be described with reference to FIG. 8. FIG. 8 is a flow chart showing a processing procedure in the contribution amount mediating system according to the second embodiment of the present disclosure.

Referring to FIG. 8, a contribution amount mediating system 2 according to the second embodiment includes the creator terminal 10, the user terminal 20, the content sharing server 30, and a mediating server 40*a*. The functions of the creator terminal 10, the user terminal 20, and the content sharing server 30 are the same as the functions of the creator terminal 10, the user terminal 20, and the content sharing server 30 according to the first embodiment shown in FIG. 1 and FIG. 2. Further, the processes in the step S101 to the step S115 and the processes in the step S123 to S127 shown in FIG. 8 are the same as the processes therein in the first embodiment shown in FIG. 3; therefore, a detailed description thereof will be omitted here. In the second embodiment, instead of the processes in the step S117 to S121 in the first embodiment, processes in steps S117*a* to S121*a* are performed.

Referring to FIG. 8, in the step S117*a*, the user's side distribution conditions are inputted through a distribution condition setting screen. Here, in the first embodiment, as the user's side distribution conditions, the amount of contribution and the first distribution ratio are inputted. Meanwhile, in the second embodiment, as the user's side distribution conditions, the amount of contribution and desired distribution amounts can be inputted. Here, the desired distribution amounts mean distribution amounts desired by the user to the respective creators. In this manner, in the second embodiment, the user can input the desired distribution amounts to the respective creators as the distribution conditions instead of inputting the first distribution ratio which is the distribution ratio to the respective creators.

When the user inputs the user's side distribution conditions on the distribution condition input screen 500, the user terminal 20 transmits user's side distribution condition information (contribution amount information and desired distribution amount information on the desired distribution amounts) to the mediating server 40*a* (step S119*a*).

Next, the mediating server 40*a* sets the distribution conditions on the basis of the user's side distribution condition information (step S121*a*). Here, in the first embodiment, the mediating server 40 sets the division ratio, the second distribution ratio, the amount of contribution, and the first distribution ratio, as the distribution conditions. Meanwhile, in the second embodiment, the mediating server 40*a* first sets the first distribution ratio on the basis of the division ratio, the second distribution ratio, the amount of contribution, and the desired distribution amounts, when setting the distribution conditions. And then, the mediating server 40*a* sets, in addition to the newly set first distribution ratio, the division ratio, the second distribution ratio, and the amount of contribution, which are used for setting the first distribution ratio, as the distribution conditions. In this manner, in the present embodiment, on the basis of the desired distribution amounts inputted by the user, the distribution conditions for calculating the distribution amounts to the respective creators are set, and on the basis of the distribution conditions, in the step S123, the distribution amounts to the respective creators are calculated. Note that the process in the step S121*a* will be described in detail in [2-2. Configuration of Apparatus] below.

The processing procedure of various kinds of information processing performed in the contribution amount mediating system 2 according to the second embodiment has been described above with reference to FIG. 8. As described above, in this embodiment, the user can input the desired distribution amounts to the respective creators, instead of inputting the first distribution ratio which is the distribution ratio to the respective creators, when inputting the distribution conditions. This makes it possible for the user to specify the distribution amounts to the respective creators more directly, increasing the convenience for the user inputting the distribution conditions.

[2-2. Configuration of Apparatus]

Figure 9:
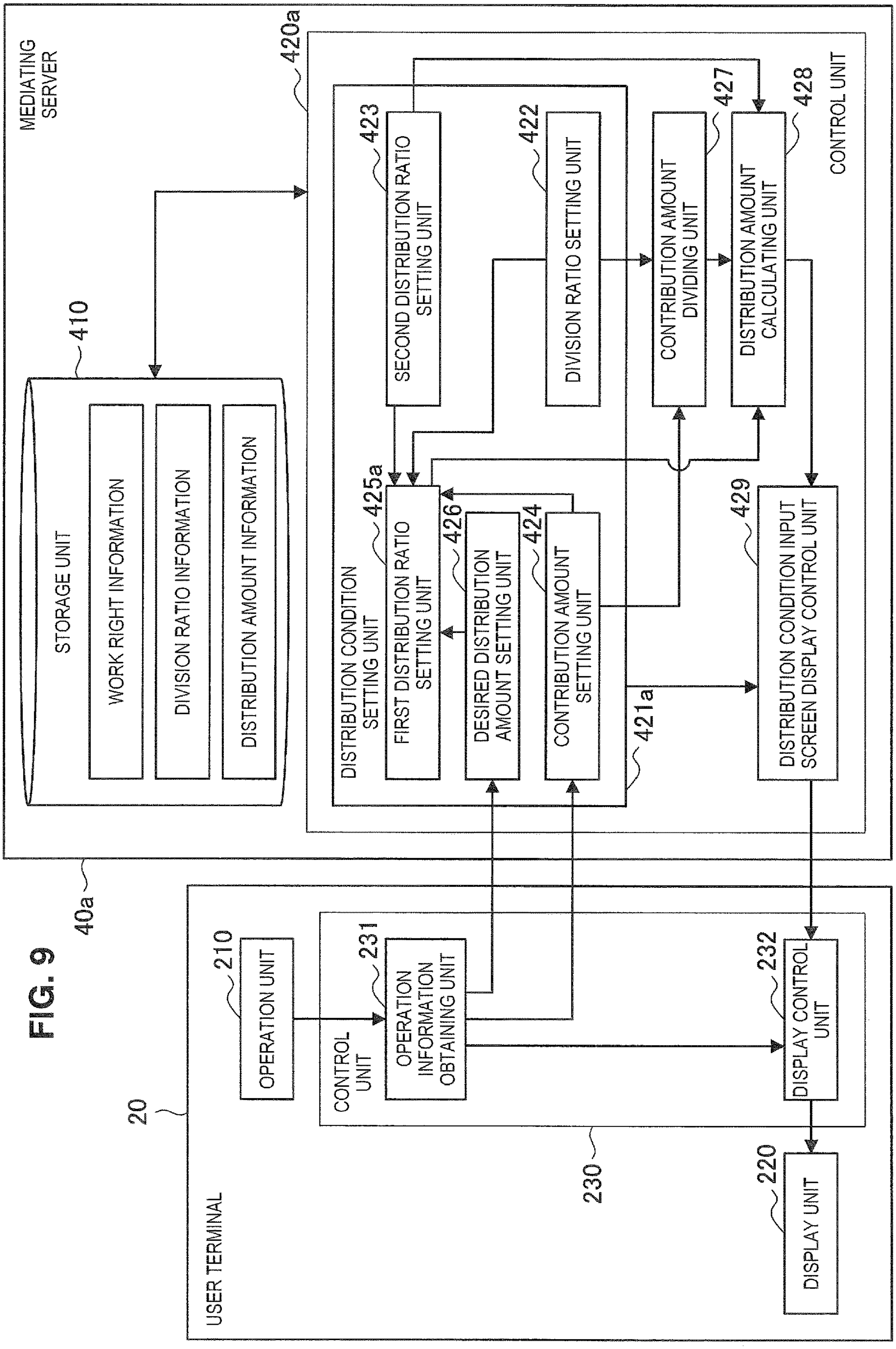
FIG. 9 is a functional block diagram showing functional configurations of apparatuses included in a contribution amount mediating system according to a second embodiment of the present disclosure.

Next, functional configurations of the respective apparatuses included in the contribution amount mediating system 2 according to the second embodiment of the present disclosure will be described with reference to FIG. 9. FIG. 9 is a functional block diagram showing the functional configurations of the respective apparatuses included in the contribution amount mediating system 2 according to the second embodiment of the present disclosure. Note that in FIG. 9, among the apparatuses included in the contribution amount mediating system 2, the creator terminal 10 and the content sharing server 30 are omitted, and only the user terminal 20 and the mediating server 40*a* are shown. The creator terminal 10 and the content sharing server 30 are configured to be able to perform each process described with reference to FIG. 1 and FIG. 3, and can be achieved by a management server for a common content sharing system or a functional configuration of a common information processing apparatus, for example. Further, the functional configurations shown in FIG. 9 are simplified for the description of the present embodiment, and the respective apparatuses may further include functional configurations that are not shown. Since the functional configurations that are not shown can be known and common functional configurations of the respective apparatuses, a detailed description thereof is omitted here. For example, various pieces of information may be transmitted and received between the user terminal 20 and the mediating server 40*a* through a wired or wireless network (not shown) by use of a communication device (not shown) included in each apparatus.

In the second embodiment, a functional configuration of a distribution condition setting unit 421*a* (shown in FIG. 9) of the mediating server 40*a* is different from that in the first embodiment. Since the other functional configurations are the same as the functional configurations of the user terminal 20 and the mediating server 40 in the first embodiment shown in FIG. 3, a detailed description thereof is omitted. From among the functional configurations of the mediating server 40*a* according to the second embodiment, the functional configuration of the distribution condition setting unit 421*a* having a different function from that in the first embodiment will be mainly described below.

The distribution condition setting unit 421*a* sets the distribution conditions which are conditions for deciding the distribution amounts to the respective creators. Functions of the distribution condition setting unit 421*a* can be subdivided. As shown in FIG. 9, the distribution condition setting unit 421*a* includes the division ratio setting unit 422, the second distribution ratio setting unit 423, the contribution amount setting unit 424, a first distribution ratio setting unit 425*a*, and a desired distribution amount setting unit 426. Here, since the functions of the division ratio setting unit 422, the second distribution ratio setting unit 423, and the contribution amount setting unit 424 are the same as those shown in the first embodiment, a detailed description thereof is omitted.

The desired distribution amount setting unit 426 temporarily sets the user's desired distribution amounts as the distribution amounts to the respective creators on the basis of operation information transmitted from the operation information obtaining unit 231 of the user terminal 20. Here, as described above, the desired distribution amounts mean the distribution amounts desired by the user to the respective creators. Further, the operation information transmitted from the operation information obtaining unit 231 may be information on the desired distribution amounts inputted by the user into a desired distribution amount information input box on the distribution condition input screen 500 displayed on the display unit 220 of the user terminal 20.

In the second embodiment, as in the first embodiment, the division ratio setting unit 422, the second distribution ratio setting unit 423, and the contribution amount setting unit 424 set the division ratio, the second distribution ratio, and the amount of contribution. Here, in the first embodiment, the first distribution ratio setting unit 425 sets the first distribution ratio on the basis of the operation information transmitted from the operation information obtaining unit 231 of the user terminal 20. Meanwhile, in the second embodiment, the first distribution ratio setting unit 425*a* sets the first distribution ratio on the basis of the division ratio, the second distribution ratio, the amount of contribution, and the desired distribution amounts.

Here, as described above in the first embodiment, the distribution amounts to the respective creators can be calculated on the basis of the division ratio, the second distribution ratio, the amount of contribution, and the first distribution ratio. This means that in a case in which four parameters out of five parameters including the distribution amounts, the division ratio, the second distribution ratio, the amount of contribution, and the first distribution ratio are given, the other one parameter can be decided. In the second embodiment, since the division ratio, the second distribution ratio, the amount of contribution, and the desired distribution amounts (i.e., the temporarily set distribution amounts) are given, the first distribution ratio setting unit 425*a* can calculate back the process performed in the contribution amount dividing unit 427 and the distribution amount calculating unit 428, thereby calculating and setting the first distribution ratio. The distribution condition setting unit 421*a* sets, in addition to the first distribution ratio set by the first distribution ratio setting unit 425*a*, the division ratio, the second distribution ratio, and the amount of contribution which are used for setting the first distribution ratio, as the distribution conditions. The contribution amount dividing unit 427 and the distribution amount calculating unit 428 calculate the distribution amounts to the respective creators on the basis of the distribution conditions.

Here, depending on the value of the desired distribution amounts inputted by the user, such a first distribution ratio that realizes the desired distribution amounts may not be set appropriately. For example, the total desired distribution amounts may exceed the amount of contribution, or the total desired distribution amounts may exceed the amount corresponding to the first part (the part obtained by division on the basis of the division ratio, the part being distributed on the basis of the first distribution ratio) of the amount of contribution. In such cases, there is no solution even if the first distribution ratio is to be calculated. Accordingly, in such cases, the first distribution ratio setting unit 425*a* can set the first distribution ratio such that the results of the calculation process of the distribution amounts, performed by the distribution amount calculating unit 428, become as close as possible to the desired distribution amounts. In a case in which the first distribution ratio setting unit 425*a* sets the first distribution ratio without conflict with the desired distribution amounts, the results of the calculation process of the distribution amounts, performed by the distribution amount calculating unit 428, become equal to the desired distribution amounts. On the other hand, in a case in which the first distribution ratio is not set so as to realize the desired distribution amounts, the distribution amount calculating unit 428 can calculate an amount that is different from the desired distribution amounts but is relatively close to the desired distribution amounts.

Information on the distribution amounts to the respective creators, the amounts being calculated by the distribution amount calculating unit 428, is provided to the distribution condition input screen display control unit 429 and displayed on the distribution condition input screen 500. In a case in which the first distribution ratio is not set so as to realize the desired distribution amounts, the distribution condition input screen display control unit 429 may cause the distribution condition input screen 500 to display information thereof.

The functional configurations of the respective apparatuses included in the contribution amount mediating system 2 according to the second embodiment of the present disclosure have been described above with reference to FIG. 9.

[2-3. Display Examples of Distribution Condition Input Screen]

Next, the distribution condition input screen in the second embodiment will be described. Here, the distribution condition input screen in the second embodiment may be the same as the distribution condition input screen 500 in the first embodiment shown in FIG. 5 and FIG. 7. However, as described above, in the second embodiment, the user can input the desired distribution amounts to the respective creators, instead of inputting the first distribution ratio, when inputting the distribution conditions. One display example of a desired distribution amount input screen for the user inputting the desired distribution amounts will be described with reference to FIGS. 10A and 10B. FIGS. 10A and 10B show display examples of the desired distribution amount input screen 550 according to the second embodiment of the present disclosure. Note that the desired distribution amount input screen 550 shown in FIGS. 10A and 10B can be said to be one of the distribution condition input screens for inputting the distribution amounts. The desired distribution amount input screen 550 may be displayed on the distribution condition information display area 520 shown in FIG. 5, for example. Further, the desired distribution amount input screen 550 may be displayed in an area different from the display screen of the display unit 220 as a screen different from the distribution condition input screen 500 shown in FIG. 5. Note that the display of the desired distribution amount input screen 550 according to this embodiment can be controlled by the distribution condition input screen display control unit 429.

Referring to FIG. 10A, in a desired distribution amount input screen 550, the distribution condition information, the distribution amount information, and the desired distribution amount information are displayed in a form of a table. In the example shown in FIG. 10A, the division ratio information, the contribution amount information, the first distribution amount information, the second distribution ratio information, the distribution amount information, and the desired distribution amount information are displayed in a form of a table. Here, in the desired distribution amount input screen 550, the division ratio display box 531, the second distribution ratio display box 532, the contribution amount input box 533, the distribution proportion display box 535, and the distribution amount display box 536 are the same as those in the distribution ratio input screen 530 shown in FIGS. 6A and 6B, and therefore, a detailed description thereof is omitted.

The desired distribution amount input screen 550 includes a first distribution ratio display box 534*a* in which the first distribution ratio information is displayed. Before the user's side distribution conditions are inputted, the first distribution ratio display box 534*a* is blank. When the user's side distribution conditions are inputted and the first distribution ratio setting unit 425*a* sets the first distribution ratio on the basis of the division ratio, the second distribution ratio, the amount of contribution, and the desired distribution amounts, information on the set first distribution ratio can be displayed in the first distribution ratio display box 534*a*.

Further, the desired distribution amount input screen 550 includes a desired distribution amount input box 537 for inputting the desired distribution amounts. Into the desired distribution amount input box 537, a desired value can be inputted in accordance with a user's operation. Since FIG. 10A shows an example of a state in which the amount of contribution and the desired distribution amounts are not inputted by the user, the contribution amount input box 533 and the desired distribution amount input box 537 are blank. Further, the first distribution ratio display box 534*a*, the distribution proportion display box 535, and the distribution amount display box 536, in which the results of processes performed by the mediating server 40 can be displayed, are also blank.

FIG. 10B shows a display example of the desired distribution amount input screen 550 in a case in which the user inputs the amount of contribution and the desired distribution amounts into the contribution amount input box 533 and the desired distribution amount input box 537 in the state shown in FIG. 10A. In the example shown in FIG. 10B, a case in which one hundred yen is inputted as the amount of contribution is shown for simplicity. Information on the inputted amount of contribution and desired distribution amounts is transmitted to the mediating server 40*a* and the first distribution ratio is set by the first distribution ratio setting unit 425*a* of the mediating server 40*a*. Further, the distribution amounts to the respective creators are calculated by the contribution amount dividing unit 427 and the distribution amount calculating unit 428. In FIG. 10B, information on the first distribution ratio set by the first distribution ratio setting unit 425*a* and the distribution amounts calculated by the distribution amount calculating unit 428 and proportions thereof is displayed in the first distribution ratio display box 534*a*, the distribution amount display box 536, and the distribution proportion display box 535. In a case in which such a first distribution ratio that realizes the desired distributed amounts inputted by the user is not set appropriately, the first distribution ratio by which the distribution amounts that are relatively close to the desired distribution amounts can be calculated, the first distribution ratio being set as appropriate by the first distribution ratio setting unit 425*a*, is displayed in the first distribution ratio display box 534*a*. In the example shown in FIG. 10B, since the first distribution ratio that can realize the desired distribution amounts can be set appropriately, the input value into the desired distribution amount input box 537 and the value displayed in distribution amount display box 536 are equal. A change in the input value into the contribution amount input box 533 and the desired distribution amount input box 537 can change dynamically the display in the first distribution ratio display box 534*a*, the distribution proportion display box 535, and the distribution amount display box 536.

The second embodiment of the present disclosure has been described above. As described above, in the second embodiment of the present disclosure, the user can specify the desired distribution amounts to the respective creators as the distribution conditions. In this manner, in the second embodiment, in addition to the effects obtained in the first embodiment, effects of realizing the input of the distribution conditions in accordance with the user's intention are obtained by making it possible for the user to specify the distribution amounts to the respective creators directly as the distribution conditions.

Note that in the above description, as the display example in a GUI for inputting the desired distribution amounts, the desired distribution amount input screen 550 shown in FIGS. 10A and 10B has been described; however, the second embodiment is not limited to this example. In the second embodiment, a screen for inputting the desired distribution amounts may have another form. For example, in areas displaying the distribution amount information 526*a* to 526*g* and 546*a* to 546*g* in the distribution condition information display areas 520 and 540 shown in FIG. 5 and FIG. 7, input boxes into which the user inputs the desired distribution amounts may be provided. The provision of the input boxes of the desired distribution amounts in association with the content icons 524*a*, 524*b*, 544*a*, and 544*b* and the creator icons 525*a* to 525*e* and 545*a* to 545*e* makes it easier for the user to recognize the relevance among the content, the creators, and the desired distribution amounts, increasing the user's convenience when inputting the desired distribution amounts.

3. Hardware Configuration

Figure 11:
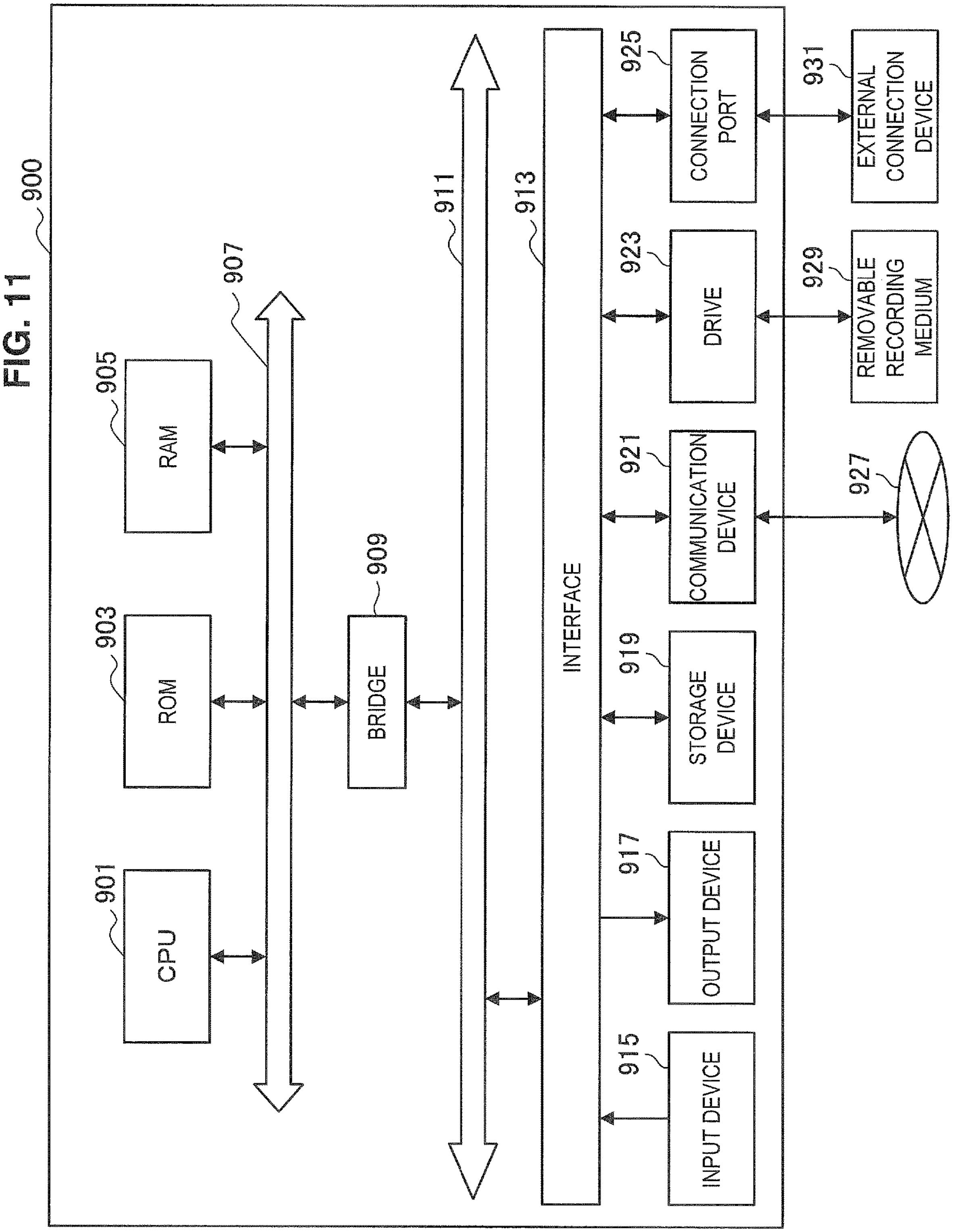
FIG. 11 is a block diagram showing a hardware configuration of an information processing apparatus according to a first embodiment and a second embodiment of the present disclosure.

Next, a hardware configuration of an information processing apparatus 900 according to the first embodiment and the second embodiment of the present disclosure will be described with reference to FIG. 11. FIG. 11 is a block diagram showing the hardware configuration of the information processing apparatus 900 according to the first embodiment and the second embodiment of the present disclosure. Note that the information processing apparatus 900 shown in FIG. 11 can realize the creator terminal 10, the user terminal 20, the content sharing server 30, and the mediating servers 40 and 40*a* shown in any of FIG. 1, FIG. 4, and FIG. 8, for example.

The information processing apparatus 900 includes a CPU 901, read only memory (ROM) 903, and random access memory (RAM) 905. The information processing apparatus 900 may further include a host bus 907, a bridge 909, an external bus 911, an interface 913, an input device 915, an output device 917, a storage device 919, a communication device 921, a drive 923, and a connection port 925. The information processing apparatus 900 may include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 929. The ROM 903 stores programs and arithmetic parameters used by the CPU 901. The RAM 905 temporarily stores programs used in execution of the CPU 901 and parameters and the like used during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909. The CPU 901 corresponds to any of the control units 230, 420, and 420*a* of the user terminal 20 and the mediating servers 40 and 40*a*, for example, in the present embodiment.

The input device 915 is configured by a device operated by a user, such as a mouse, a keyboard, a touch panel, buttons, a switch, and a lever. Also, the input device 915 may be a remote control device using, for example, infrared light or other radio waves, or may be an external connection device 931 such as a mobile phone or a PDA compatible with the operation of the information processing apparatus 900. The input device 915 includes an input control circuit that generates an input signal on the basis of information inputted by the user by use of the above described operation means and outputs the input signal to the CPU 901, for example. The user of the information processing apparatus 900 can input various kinds of data to the information processing apparatus 900 and can instruct the information processing apparatus 900 to perform a processing operation by operating the input device 915. The input device 915 corresponds to the operation unit 210 of the user terminal 20, for example, in the present embodiment.

The output device 917 is configured by a device capable of visually or aurally notifying the user of acquired information. For example, the output device 917 may be a display device such as a CRT display, a liquid crystal display, a plasma display, an EL display, or a lamp; an audio output device such as a speaker and headphones; or a printer. The output device 917 outputs results obtained by the processing performed by the information processing apparatus 900, for example. Specifically, the display device displays visually the results obtained by the processing performed by the information processing apparatus 900 in any of various forms such as a text, an image, a table, and a graph. The display device corresponds to the display unit 220 of the user terminal 20, for example, in the present embodiment. On the other hand, the audio output device outputs aurally an audio signal such as reproduced sound data or acoustic data being converted into an analog signal.

The storage device 919 is a device for storing data configured as an example of a storage unit of the information processing apparatus 900. The storage device 919 is configured by, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside. The storage device 919 corresponds to the storage unit 410 of the mediating server 40, for example, in the present embodiment.

The communication device 921 is a communication interface configured by, for example, a communication device for establishing a connection to a communication network 927. The communication device 921 is, for example, a wired or wireless local area network (LAN), Bluetooth (registered trademark), a communication card for wireless USB (WUSB), or the like. Alternatively, the communication device 921 may be a router for optical communication, a router for asymmetric digital subscriber line (ADSL), a modem for various communications, or the like. The communication device 921 can transmit and receive signals and the like using a given protocol such as TCP/IP on the Internet and with other communication devices, for example. The communication network 927 connected to the communication device 921 is configured by a network and the like, which is connected via wire or wirelessly, and is, for example, the Internet, a home-use LAN, infrared communication, radio wave communication, and satellite communication. In the present embodiment, for example, various pieces of information processed in each step shown in FIG. 3 and FIG. 8 can be transmitted and received between or among apparatuses through the communication network 927 by the communication device 921.

The drive 923 is a reader/writer for the removable recording medium and is built in or externally attached to the information processing apparatus 900. The drive 923 reads out information recorded on the attached removable recording medium 929, such as a magnetic disk, an optical disk, a magneto-optical disk, or a semiconductor memory, and outputs the information to the RAM 905. Further, the drive 923 can write information on the attached removable recording medium 929, such as a magnetic disk, an optical disc, a magneto-optical disk, or a semiconductor memory. Examples of the removable recording medium 929 include a DVD medium, an HD-DVD medium, a Blu-ray (registered trademark) medium. Alternatively, the removable recording medium 929 may be a Compact Flash (CF, registered trademark), a flash memory, a secure digital memory card (SD memory card), or the like. Further alternatively, the removable recording medium 929 may be, for example, an integrated circuit card (IC card) on which a contactless IC chip is mounted, an electronic device, or the like. In the present embodiment, for example, various pieces of information processed in each step shown in FIG. 3 and FIG. 8 may be read out from the removable recording medium 929 or written into the removable recording medium 929 by the drive 923.

The connection port 925 is a port for allowing devices to directly connect to the information processing apparatus 900. Examples of the connection port 925 include a universal serial bus (USB) port, an IEEE1394 port, and a small computer system interface (SCSI) port. Other examples of the connection port 925 may include an RS-232C port, an optical audio terminal, and a high-definition multimedia interface (HDMI, registered trademark) port. The connection of the external connection device 931 to the connection port 925 may enable the various data to be obtained directly from the external connection device 931 or to be provided to the external connection device 931. In the present embodiment, for example, various pieces of information processed in each step shown in FIG. 3 and FIG. 8 may be obtained from the external connection device 931 or outputted to the external connection device 931 via the connection port 925.

The example of the hardware configuration that can realize the functions of the information processing apparatus 900 according to an embodiment of the present disclosure has been described above. Each structural element described above may be formed by a common member or configured by hardware having a special function of each structural element. Accordingly, it is possible to change the hardware configuration to be used as appropriate depending on technique levels when the present embodiment is executed.

Note that it is possible to create a computer program for realizing each function of the above described information processing apparatus 900 according to the present embodiment and to incorporate the program in a PC or the like. Further, it is possible to provide a computer-readable recording medium having such a computer program stored therein. The recording medium may be, for example, a magnetic disk, an optical disk, a magneto-optical disk, or a flash memory. Further, the computer program may be distributed through the communication network 927, for example, without using the recoding medium.

4. Supplementary Explanation

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

For example, although the above described embodiments have shown the case in which the contribution amount input boxes 522, 533, and 542 are provided on the distribution condition input screen 500 and the user inputs a specific value as the amount of contribution, the present technology is not limited to this example. For example, a contribution button may be provided on the distribution condition input screen 500 and a certain amount of money can be inputted as the amount of contribution every time the user selects the button so that the amount of contribution in accordance with the times of selection of the contribution button by the user can be inputted as the distribution conditions. The amount of contribution can be inputted more easily by selecting a button, increasing the user's convenience.

Further, for example, although the above described embodiments have shown the case in which the target content is a secondary production and the first distribution ratio and the second distribution ratio are set with respect to the creators of the target content and the parent content, the present technology is not limited to this example. For example, for superordinate content in the citation relation, such as the parent content of the parent content, the first distribution ratio and the second distribution ratio can be set, and on the basis of the first distribution ratio and the second distribution ratio, the amount of contribution may be provided to a creator or creators of such superordinate content.

Here, as described above, in the present embodiment, the distribution amounts to the respective creators are decided on the basis of the distribution conditions, for example, in a case in which the creators have deleted account information in the content sharing system or in a case in which the relevance between the target content and the original content is not clear, the distribution amounts to the creators may not be paid appropriately. In this manner, in a case in which the amount of contribution from the user fails to be distributed to the creators appropriately, the amount of money that is not distributed may be temporarily retained by the contribution amount mediating systems 1 and 2 as a deposit. In order to pay the distribution amounts appropriately, the contribution amount mediating systems 1 and 2 can perform various kinds of treatment, such as sending a notification of the payment of the distribution amounts to the creators who have deleted the account information or sending a notification of promoting a new registration of the relevance with the original content to the creators of the target content.

Furthermore, for example, there may be a creator who objects to his or her distribution amount among the creators of the target content and/or the original content. Accordingly, in the present embodiment, the contribution amount mediating systems 1 and 2 may include a system that enables a creator to object to the distribution amount. In a case of the objection, the contribution amount mediating systems 1 and 2 can provide the user and the creator with an opportunity of consultation or mediation between the user and the creator. In a case in which the consultation or the mediation fails, the target content may be deleted by using so-called notice and take down, and the amount of contribution may be returned to the user.

When the user and the creators specify the first distribution ratio and the second distribution ratio, if a distribution ratio to a specific creator is set to be unjustly low (e.g., zero), for example, the creator may objects. In view of such a circumstance, in the present embodiment, the first distribution ratio and the second distribution ratio may have an upper limit and/or a lower limit. The setting of the upper limit and/or the lower limit can be said to be setting of a ratio (reserve ratio defining a reserve) defining a minimum distribution amount that each creator can receive. The upper limit and/or the lower limit can be set as appropriate in a manner that the distribution ratios to the respective creators can be valid ratios in consideration of various laws, regulations, institutions, and the like, for example.

Additionally, the present technology may also be configured as below.

(1) An information processing apparatus including:

a contribution amount dividing unit configured to divide an amount of contribution to a plurality of creators in association with content into a first part and a second part on the basis of a certain division ratio, the first part being distributed on the basis of a first distribution ratio, the second part being distributed on the basis of a second distribution ratio; and a distribution amount calculating unit configured to calculate distribution amounts of the contribution to the respective creators on the basis of an amount corresponding to the first part, an amount corresponding to the second part, the first distribution ratio, and the second distribution ratio.

(2) The information processing apparatus according to (1), further including:

a first distribution ratio setting unit configured to set the first distribution ratio on the basis of operation information on an operation input performed by a user.

(3) The information processing apparatus according to (1) or (2), further including:

a second distribution ratio setting unit configured to set the second distribution ratio on the basis of work right information including at least information on relevance between the content and the creators.

(4) The information processing apparatus according to any one of (1) to (3), further including:

a division ratio setting unit configured to set the division ratio on the basis of division ratio information in association with the content.

(5) The information processing apparatus according to any one of (1) to (4), further including:

a contribution amount setting unit configured to set the amount of contribution on the basis of operation information on an operation input performed by a user.

(6) The information processing apparatus according to any one of (1) to (5), wherein in a case in which the content is a secondary production based on original content which is other content, the first distribution ratio and the second distribution ratio include a distribution ratio of the amount of contribution to the original content.

(7) The information processing apparatus according to (6), further including:

a second distribution ratio setting unit configured to set the second distribution ratio on the basis of work right information including at least information on relevance between the content and the creators, wherein the work right information further includes information on relevance between the content and the original content, and wherein the second distribution ratio setting unit sets the distribution ratio of the amount of contribution to the original content on the basis of the work right information, the distribution ratio being included in the second distribution ratio.

(8) The information processing apparatus according to any one of (1) to (7), further including:

a desired distribution amount setting unit configured to temporarily set desired distribution amounts of a user as distribution amounts to the respective creators on the basis of operation information on an operation input performed by the user; and a first distribution ratio setting unit configured to set the first distribution ratio on the basis of the amount of contribution, the division ratio, the second distribution ratio, and the desired distribution amounts.

(9) The information processing apparatus according to any one of (1) to (8), further including:

a distribution condition input screen display control unit configured to control a display on a distribution condition input screen on which a user inputs a distribution condition as a condition for calculating, by the distribution amount calculating unit, the distribution amounts, wherein the distribution condition input screen display control unit causes the distribution condition input screen to display distribution condition information including at least one of contribution amount information on the amount of contribution, first distribution ratio information on the first distribution ratio, second distribution ratio information on the second distribution ratio, and division ratio information on the division ratio.

(10) The information processing apparatus according to (9), wherein the distribution condition input screen display control unit further causes the distribution condition input screen to display distribution amount information on the calculated distribution amounts, and wherein the distribution amount information is updated on the basis of the distribution condition information.

(11) The information processing apparatus according to (9) or (10), further including:

a desired distribution amount setting unit configured to temporarily set desired distribution amounts of a user as distribution amounts to the respective creators on the basis of operation information on an operation input performed by the user, wherein the distribution condition information includes desired distribution amount information on the desired distribution amounts, and wherein the distribution condition input screen display control unit further causes the distribution condition input screen to display the desired distribution amount information.

(12) The information processing apparatus according to any one of (9) to (11), wherein the distribution condition input screen display control unit causes the distribution condition input screen to display the distribution condition information and the distribution amount information on the calculated distribution amounts in a form of a table.

(13) The information processing apparatus according to any one of (9) to (12), wherein the distribution condition input screen display control unit further causes the distribution condition input screen to display work right information including at least information on relevance between the content and the creators in a form of a tree diagram showing the relevance between the content and the creators.

(14) The information processing apparatus according to (13), wherein, in the tree diagram, content icons representing the content and creator icons representing the respective creators are displayed in portions corresponding to nodes, and links are displayed between the content icons and the creator icons having relevance.

(15) The information processing apparatus according to (14), wherein, in the tree diagram, the distribution amount information on the distribution amounts to the creators is displayed in association with the creator icons.

(16) The information processing apparatus according to (14) or (15), further including:

a desired distribution amount setting unit configured to temporarily set desired distribution amounts of the user as distribution amounts to the respective creators on the basis of operation information on an operation input performed by the user, wherein, in the tree diagram, a desired distribution amount input box for inputting each of the desired distribution amounts is displayed in association with the creator icons.

(17) The information processing apparatus according to any one of (14) to (16), wherein, in the tree diagram, the creator icons and the links displayed with respect to the creator icons are displayed in sizes in accordance with the distribution amounts to the creators.

(18) The information processing apparatus according to (17), wherein each of the creator icons is more largely displayed as the distribution amount to the corresponding creator is larger, and each of the links is more thickly displayed as the distribution amount to the corresponding creator is larger.

(19) An information processing method including:

dividing an amount of contribution to a plurality of creators in association with content into a first part and a second part on the basis of a certain division ratio, the first part being distributed on the basis of a first distribution ratio, the second part being distributed on the basis of a second distribution ratio; and calculating, by a processor, distribution amounts of the contribution to the respective creators on the basis of an amount corresponding to the first part, an amount corresponding to the second part, the first distribution ratio, and the second distribution ratio.

(20) A program for causing a computer to realize:

a function of dividing an amount of contribution to a plurality of creators in association with content into a first part and a second part on the basis of a certain division ratio, the first part being distributed on the basis of a first distribution ratio, the second part being distributed on the basis of a second distribution ratio; and a function of calculating distribution amounts of the contribution to the respective creators on the basis of an amount corresponding to the first part, an amount corresponding to the second part, the first distribution ratio, and the second distribution ratio.

What is claimed is:

1. An information processing apparatus, comprising:

a display device; and at least one processor configured to:

control the display device to display an input screen that comprises a first table, wherein the first table is created based on a division ratio and a second distribution ratio that are specified by at least one creator of a plurality of creators;

receive an amount of a first financial contribution on the first table, based on a first input from a user;

receive a distribution condition of the first financial contribution corresponding to each creator of the plurality of creators, based on a second input by the user;

set a first distribution ratio based on the distribution condition, the first financial contribution, the division ratio, and the second distribution ratio;

divide the amount of the first financial contribution into a first part and a second part based on the division ratio specified by the at least one creator, wherein the amount of the first financial contribution corresponds to content displayed on the display device;

distribute the first part of the first financial contribution based on the second distribution ratio;

distribute the second part of the first financial contribution based on the second distribution ratio specified by the at least one creator;

calculate a distribution amount of the first financial contribution to the each creator of the plurality of creators based on an amount corresponding to the first part, an amount corresponding to the second part, the first distribution ratio, and the second distribution ratio;

modify the first table into a second table, wherein the second table is created based on the second distribution ratio, the amount of the first financial contribution, and the calculated distribution amount of the first financial contribution;

control the display device to display the second table that includes the calculated distribution amount of the first financial contribution to the user;

receive work right information from the plurality of creators;

control the display device to display the work right information in a tree diagram format, wherein the work right information includes information associated with a relevance between the content displayed on the display device and the plurality of creators; and notify the each creator of the plurality of creators of the calculated distribution amount based on the displayed work right information.

2. The information processing apparatus according to claim 1, wherein the at least one processor is further configured to set the second distribution ratio based on the work right information.

3. The information processing apparatus according to claim 1, wherein the at least one processor is further configured to set the division ratio based on division ratio information, and the division ratio information is associated with the content.

4. The information processing apparatus according to claim 1, wherein the content displayed on the display device is based on original content, and the first distribution ratio and the second distribution ratio further include information about a third distribution ratio of an amount of a second financial contribution to the original content.

5. The information processing apparatus according to claim 4, wherein the at least one processor is further configured to:

set the second distribution ratio based on the work right information, the work right information further includes information associated with a relevance between the content and the original content, and set the third distribution ratio of the amount of a second financial contribution to the original content based on the information associated with the relevance between the content and the original contently.

6. The information processing apparatus according to claim 1, wherein the displayed input screen further comprises display distribution condition information, and the display distribution condition information includes at least one of the amount of the first financial contribution, the first distribution ratio, the second distribution ratio, or the division ratio.

7. The information processing apparatus according to claim 6, wherein the distribution amount is updated based on the distribution condition information.

8. The information processing apparatus according to claim 6, wherein the at least one processor is further configured to:

set a plurality of distribution amounts of the first financial contribution of the plurality of creators based on the second input, the plurality of distribution amounts includes the calculated distribution amount, and display the set plurality of distribution amounts on the second table.

9. The information processing apparatus according to claim 8, wherein, in the tree diagram format, a plurality of content icons and a plurality of creator icons are displayed in portions, the plurality of content icons represents the content, the plurality of creator icons represents the plurality of creators, the portions correspond to nodes, and a plurality of links are displayed between the plurality of content icons and the plurality of creator icons.

10. The information processing apparatus according to claim 9, wherein, in the tree diagram format, the plurality of distribution amounts is displayed in association with the plurality of creator icons.

11. The information processing apparatus according to claim 9, wherein, in the tree diagram format, a distribution amount input box to input each of the set plurality of distribution amounts is displayed in association with the plurality of creator icons.

12. The information processing apparatus according to claim 9, wherein, in the tree diagram format, sizes of the plurality of creator icons and sizes of the plurality of links are based on the set plurality of distribution amounts to the plurality of creators.

13. The information processing apparatus according to claim 12, wherein a thickness of each link of the plurality of links is based on the set distribution amount to the corresponding creator of the plurality of creators.

14. An information processing method, comprising:

in one or more processors:

controlling a display device to display an input screen that comprises a first table, wherein the first table is created based on a division ratio and a second distribution ratio that are specified by at least one creator of a plurality of creators;

receiving an amount of a financial contribution on the first table, based on a first input by a user;

receiving a distribution condition of the financial contribution corresponding to each creator of the plurality of creators based on a second input by the user;

setting a first distribution ratio based on the distribution condition, the financial contribution, the division ratio, and the second distribution ratio;

dividing the amount of the financial contribution into a first part and a second part based on the division ratio specified by the at least one creator, wherein the amount of the financial contribution corresponds to content displayed on the display device;

distributing the first part of the financial contribution based on the first distribution ratio;

distributing the second part of the financial contribution based on the second distribution ratio specified by the at least one creator;

calculating a distribution amount of the financial contribution to the each creator of the plurality of creators based on an amount corresponding to the first part, an amount corresponding to the second part, the first distribution ratio, and the second distribution ratio;

modifying the first table into a second table, wherein the second table is created based on the second distribution ratio, the amount of the financial contribution, and the calculated distribution amount of the financial contribution;

controlling the display device to display the second table that includes the calculated distribution amount of the financial contribution to the user;

receiving work right information from the plurality of creators;

controlling the display device to display the work right information in a tree diagram format, wherein the work right information includes information associated with a relevance between the content displayed on the display device and the plurality of creators; and notifying the each creator of the plurality of creators of the calculated distribution amount based on the displayed work right information.

15. A non-transitory computer-readable medium having stored thereon computer-executable instructions that, when executed by a processor, cause the processor to execute operations, the operations comprising:

controlling a display device to display an input screen that comprises a first table, wherein the first table is created based on a division ratio and a second distribution ratio that are specified by at least one creator of a plurality of creators;

receiving an amount of a financial contribution on the first table, based on a first input from a user;

receiving a distribution condition of the financial contribution corresponding to each creator of the plurality of creators, based on a second input by the user;

setting a first distribution ratio based on the distribution condition, the financial contribution, the division ratio, and the second distribution ratio;

dividing the amount of the financial contribution into a first part and a second part based on the division ratio specified by the at least one creator, wherein the amount of the financial contribution corresponds to content displayed on the display device;

distributing the first part based on the first distribution ratio;

distributing the second part based on the second distribution ratio specified by the at least one creator;

calculating the divided amounts of the financial contribution to the each creator of the plurality of creators based on an amount corresponding to the first part, an amount corresponding to the second part, the first distribution ratio, and the second distribution ratio;

modifying the first table into a second table, wherein the second table is created based on the second distribution ratio, the amount of the financial contribution, and the calculated divided amounts of the financial contribution;

controlling the display device to display the second table that includes the calculated divided amounts of the financial contribution to the user;

receiving work right information from the plurality of creators;

controlling the display device to display the work right information in a tree diagram format, wherein the work right information includes information associated with a relevance between the content displayed on the display device and the plurality of creators; and notifying the each creator of the plurality of creators of the calculated distribution amount based on the displayed work right information.

* * * * *